(12) United States Patent
Tokuchi

(10) Patent No.: US 10,796,459 B2
(45) Date of Patent: Oct. 6, 2020

(54) INFORMATION PROCESSING APPARATUS AND NON-TRANSITORY COMPUTER READABLE MEDIUM FOR EXECUTING INFORMATION PROCESSING

(71) Applicant: FUJI XEROX CO., LTD., Tokyo (JP)

(72) Inventor: Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 75 days.

(21) Appl. No.: 16/027,373

(22) Filed: Jul. 5, 2018

(65) Prior Publication Data
US 2019/0114810 A1 Apr. 18, 2019

(30) Foreign Application Priority Data
Oct. 16, 2017 (JP) .................. 2017-200629

(51) Int. Cl.
G06T 11/00 (2006.01)
G06T 11/60 (2006.01)
H04N 1/00 (2006.01)

(52) U.S. Cl.
CPC .............. *G06T 11/00* (2013.01); *G06T 11/60* (2013.01); *G06T 2200/24* (2013.01); *H04N 1/00079* (2013.01); *H04N 1/00408* (2013.01); *H04N 2201/0094* (2013.01)

(58) Field of Classification Search
CPC ...... G06T 11/00; G06T 11/60; G06T 2200/24
See application file for complete search history.

(56) References Cited

U.S. PATENT DOCUMENTS

| | | | |
|---|---|---|---|
| 2011/0052083 A1* | 3/2011 | Rekimoto | H04N 1/00244 382/218 |
| 2012/0056992 A1* | 3/2012 | Kuroda | G06T 19/006 348/46 |
| 2012/0105475 A1* | 5/2012 | Tseng | G01C 21/3611 345/633 |
| 2016/0058158 A1* | 3/2016 | Tomita | H04N 5/23222 348/78 |
| 2017/0140504 A1* | 5/2017 | Jeong | G06F 1/1677 |
| 2017/0200048 A1* | 7/2017 | Yamada | G01C 21/00 |
| 2017/0372499 A1* | 12/2017 | Lalonde | G02B 27/017 |
| 2018/0241890 A1* | 8/2018 | Fujita | H04N 1/0092 |

FOREIGN PATENT DOCUMENTS

| | | |
|---|---|---|
| JP | 2008288922 | 11/2008 |
| JP | 2012058968 | 3/2012 |
| JP | 2012165447 | 8/2012 |

* cited by examiner

*Primary Examiner* — Chun-Nan Lin
(74) *Attorney, Agent, or Firm* — JCIPRNET

(57) ABSTRACT

An information processing apparatus includes a controller configured to control a mode of display of each piece of information in such a manner that a part or whole of each piece of information included in a plurality of pieces of information related to a specific position is displayed on a display unit.

19 Claims, 23 Drawing Sheets

POSITION A    POSITION B

INFORMATION PROCESSING APPARATUS AND NON-TRANSITORY COMPUTER READABLE MEDIUM FOR EXECUTING INFORMATION PROCESSING

CROSS-REFERENCE TO RELATED APPLICATIONS

This application is based on and claims priority under 35 USC 119 from Japanese Patent Application No. 2017-200629 filed Oct. 16, 2017.

BACKGROUND

Technical Field

The present invention relates to an information processing apparatus and a non-transitory computer readable medium.

SUMMARY

According to an aspect of the invention, there is provided an information processing apparatus including a controller configured to control a mode of display of each piece of information in such a manner that a part or whole of each piece of information included in plural pieces of information related to a specific position is displayed on a display unit.

BRIEF DESCRIPTION OF THE DRAWINGS

Exemplary embodiments of the present invention will be described in detail based on the following figures, wherein.

DETAILED DESCRIPTION

First Exemplary Embodiment

Figure 1:
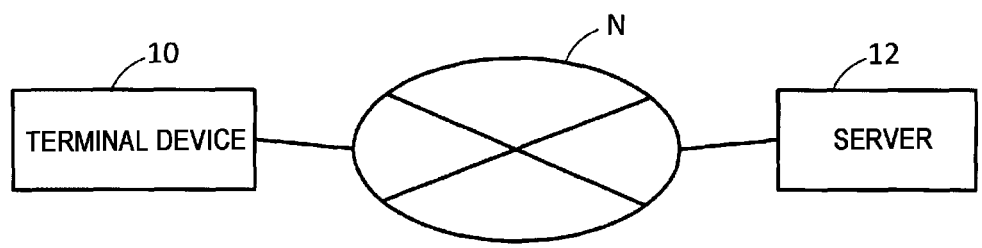
FIG. 1 is a block diagram illustrating a configuration of an information processing system according to a first exemplary embodiment of the present invention.

An information processing system according to a first exemplary embodiment of the present invention will be described with reference to FIG. 1. FIG. 1 illustrates an example of the information processing system according to the first exemplary embodiment.

The information processing system according to the first exemplary embodiment includes a terminal device 10 and a server 12 as an example. In the example illustrated in FIG. 1, the terminal device 10 and the server 12 have a function of communicating with each other via a communication path N such as a network. The information processing system may include plural terminal devices 10 and plural servers 12.

The terminal device 10 is a device such as a personal computer (PC), a tablet PC, a smartphone, or a mobile phone, and has a function of exchanging data with other devices. Further, the terminal device 10 may be a wearable terminal (e.g., a wristwatch type terminal, a wristband type terminal, a spectacle type terminal, a ring type terminal, a contact lens type terminal, an intracorporeal embedded terminal, a hearable terminal, or the like).

The server 12 is a device that manages data, user information, or the like.

In the first exemplary embodiment, various pieces of information are displayed on the terminal device 10 using the augmented reality (AR) technology (extended reality technology) as an example. For example, information related to a target to be captured is displayed on the terminal device 10. As the AR technology, a known AR technology is used. For example, a position AR technology using position information, an image AR technology using image analysis, and the like are used. As the image AR technology, for example, a marker type AR technology using a marker such as a two-dimensional barcode, a marker-free AR technology using an image recognition technology without using a marker, and the like are used.

Figure 2:
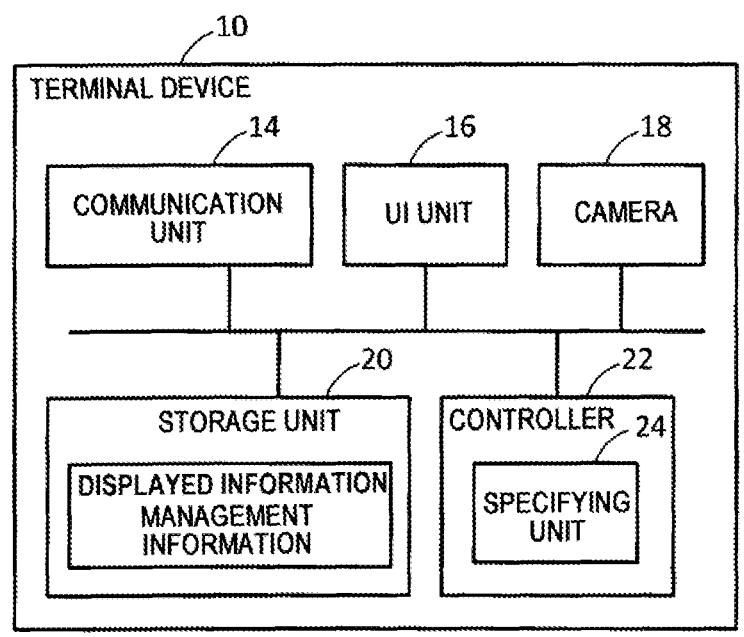
FIG. 2 is a block diagram illustrating a configuration of a terminal device.

Hereinafter, the configuration of the terminal device 10 will be described in detail with reference to FIG. 2.

A communication unit 14 is a communication interface and has a function of transmitting data to other devices and a function of receiving data from other devices. The communication unit 14 may be either a communication interface having a wireless communication function or a communication interface having a wired communication function. For example, the communication unit 14 corresponds to one or more types of communication methods and may communicate with a communication partner according to a communication method suitable for the communication partner (i.e., a communication method supported by the communication partner). The communication method is, for example, infrared communication, visible light communication, Wi-Fi® communication, close proximity wireless communication (e.g., near field communication (NFC), etc.), or the like. As for the close proximity wireless communication, Felica®, Bluetooth®, radio frequency identifier (RFID), or the like is used. Of course, other types of wireless communication may be used as the proximity wireless communication. The communication unit 14 may switch the communication method or the frequency band depending on a communication partner or the surrounding environments.

An UI unit 16 is a user interface unit and includes a display unit and an operation unit. The display unit is a display device such as a liquid crystal display. The operation unit is an input device such as a touch panel or a keyboard. The UI unit 16 may be a user interface that also serves as a display unit and an operation unit (including, e.g., a touch type display, a device that electronically displays a keyboard or the like on a display). Further, the UI unit 16 may include a sound collecting unit such as a microphone and a sound generating unit such as a speaker. In this case, information may be input to the terminal device 10 by voice input or may be issued by voice.

The camera 18 as a capturing unit generates image data (e.g., still image data and moving image data) by capturing a target. The image is displayed on, for example, the display unit of the UI unit 16. The image displayed on the display unit may be operated by a user. The image data captured by an external camera may be transmitted to the terminal device 10 via a communication path, and the image may be displayed on the display unit of the UI unit 16. Also, in this case, the image may be manipulated by the user.

A storage unit 20 is a storage device such as a hard disk or a memory (e.g., an SSD). The storage unit 20 stores displayed information management information, various types of data, various programs (e.g., an operating system (OS), various application programs (application software), and the like), information indicating the address of the terminal device 10 (terminal address information), information indicating the address of the server 12 (server address information), and the like. The storage unit 20 may also store address information related to another user or information indicating the address of another device (device address information). They may be surely stored in separate storage devices or may be stored in a single storage device.

Hereinafter, the displayed information management information will be described.

The displayed information management information is information for managing the information displayed on the display unit of the UI unit 16 using the AR technology. The displayed information management information includes, for example, management information for the position AR used in the position AR technology, and management information for the image AR used in the image AR technology.

The management information for the position AR is information that represents a correspondence between the information indicating a position (position information) and the information displayed on the display unit in relationship to the position (displayed information and content information). In other words, displayed information is associated with the position. One or more pieces of displayed information are associated with one piece of position information. The position information may be either information indicating an absolute position or information indicating a relative position. The position information is, for example, information indicating longitude and latitude. Position information may also include information indicating height.

The management information for the image AR is information that represents a correspondence between the information for identifying a target (target identification information) and the information displayed on the display unit for the target (displayed information). That is, displayed information is associated with the target. One or more pieces of displayed information are associated with one target identification information. Examples of the target identification information include the name and ID of the target, the information indicating the type of the target, the image related to the target (target image), the information indicating the address of the target (target address information), information indicating the shape of the target, and the like. Information indicating a position where the target is installed (position information) may be used as the target identification information. In this case, it may be assumed that the management information for the position AR and the management information for the image AR are the same management information.

Examples of the target include an apparatus, a building (e.g., a store, a building, a station, a hospital, a tower, other facilities, etc.), other articles (e.g., a traffic light, a sign, a signboard, other buildings and workpieces, etc.), a road, an animal, and the like.

Examples of the apparatus include an image forming apparatus having an image forming function, a display apparatus such as a PC, a tablet PC, a smartphone, a mobile phone, a robot (a humanoid robot, an animal robot other than the humanoid robot, or other robot), a projector, and a liquid crystal display, a recording device, a reproducing device, an image capturing device such as a camera, a refrigerator, a rice cooker, a microwave, a coffee maker, a vacuum cleaner, a washing machine, an air conditioner, a lighting device, a clock, a surveillance camera, a motor vehicle, a bicycle, an aircraft (e.g., unmanned airplane such as a drone), a game machine, various sensors (e.g., a temperature sensor, a humidity sensor, a voltage sensor, a current sensor, etc.), and the like. The apparatus may be an apparatus that outputs an output to a user (e.g., an image forming apparatus or a PC), or a device that does not output an output to the user (e.g., a sensing device). The concept of the apparatus may include a general apparatus. For example, an information apparatus, a video apparatus, an audio apparatus, and other apparatuses may be included in the category of the apparatus according to the first exemplary embodiment.

When the target is an apparatus, the model number of the apparatus and information for managing the apparatus (e.g., asset management number, etc.) may be used as the target identification information of the apparatus. Further, when the target is an apparatus, the displayed information may include information about the apparatus, for example, information indicating the function of the apparatus, information indicating the state of the apparatus, and the like. When the target is a store, the displayed information may include information about the store, for example, information about products sold in the store, and the like.

The target image may be, for example, an image representing the outside of the target (e.g., the housing of the device or the entire building), the inside of the target (e.g., an image representing a state in which the inside of a device can be seen from the outside of the device, or an image representing the interior of the building), or an image representing a state in which the target is covered by an article such as a sheet.

For example, the terminal device 10 acquires position information, displayed information, and target identification information to register such information in the displayed information management information. Such information may be acquired using, for example, the Internet, etc., or may be input by a user, an administrator, or the like. In addition, the terminal device 10 may update the displayed information management information at any timing, periodically, or at a timing designated by the user, the administrator, or the like. An external device such as the server 12 may generate or update the displayed information management information without the terminal device 10 itself generating or updating the displayed information management information. In this case, the displayed information management information generated or updated by the external device is transmitted from the external device to the terminal device 10, and is stored in the storage unit 20.

The controller 22 has a function of controlling the operations of the respective parts of the terminal device 10. The controller 22 controls communication by the communication unit 14, controls display of information on the display unit of the UI unit 16, writes data into the storage unit 20, reads data from the storage unit 20, and the like. The controller 22 also includes a specifying unit 24.

The specifying unit 24 has a function of specifying the displayed information displayed on the display unit of the UI unit 16 by referring to the displayed information management information.

For example, when the position AR technology is used, the specifying unit 24 uses a global positioning system (GPS), wireless communication, various sensors, or the like mounted in the terminal device 10 to acquire the position information indicating the current position of the terminal device 10 (user) (e.g., latitude, longitude, height, and the like), and uses a geomagnetic sensor (so-called electronic compass), an acceleration sensor, a gyro sensor, or the like mounted in the terminal device 10 to acquire the azimuth information indicating the azimuth toward which the camera 18 of the terminal device 10 (user) is directed. Next, by referring to the management information for the position AR, the specifying unit 24 specifies the information displayed on the display unit and determines the display position of the displayed information on the display unit based on the current position of the terminal device 10 (user) (e.g., latitude, longitude, height, and the like), the position associated with each piece of displayed information (e.g., latitude, longitude, height, and the like), and the direction of the camera 18. The specifying unit 24 specifies, for example, displayed information associated with a position where the distance from the terminal device 10 (user) is equal to or less than a predetermined threshold value.

When the image AR technology is used, the specifying unit 24 identifies a target by the image AR technology, and refers to the management information for the image AR to specify the displayed information associated with the target. In the case where the marker type AR technology is used, the specifying unit 24 identifies a target based on the marker provided in the target, and uses the result of the identification to specify the displayed information associated with the target. In the case where the marker-free AR technology is used, the specifying unit 24 identifies a target based on the shape of the target (e.g., the appearance), and uses the result of the identification to specify the displayed information associated with the target. Information related to the identified target may be stored in the storage unit 20.

Further, the target may be identified without using the AR technology. For example, when a device is connected to a network, the device may be identified based on an IP address, or a device ID may be read to identify the device. In addition, when the device has various wireless communication functions such as infrared communication, visible light communication, Wi-Fi, and Bluetooth, the device ID may be acquired using the wireless communication function to identify the device.

The controller 22 causes the displayed information specified by the specifying unit 24 to be displayed on the display unit of the UI unit 16. At this time, the controller 22 controls the mode of display of plural pieces of information in such a manner that a part or the whole of each piece of information included in the plural pieces of information is displayed on the display unit. That is, the controller 22 controls the mode of display of plural pieces of displayed information in such a manner that each piece of information is at least partially displayed on the display unit. Also, the controller 22 may causes the displayed information to be output as voice information. In this case, the displayed information is generated as voice from a speaker.

Figure 3:
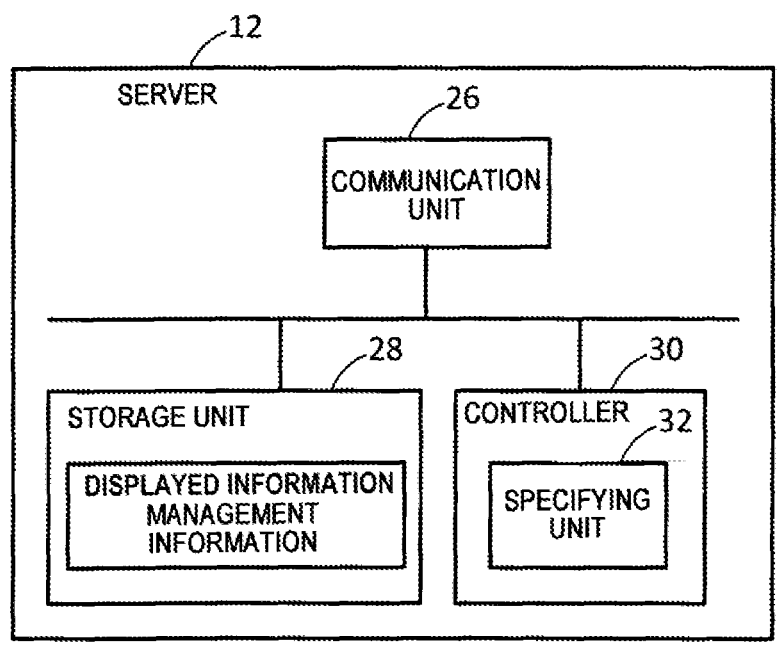
FIG. 3 is a block diagram illustrating a configuration of a server.

Hereinafter, the configuration of the server 12 will be described in detail with reference to FIG. 3. FIG. 3 illustrates the configuration of the server 12.

A communication unit 26 is a communication interface and has a function of transmitting data to other devices and a function of receiving data from other devices. The communication unit 26 may be either a communication interface having a wireless communication function or a communication interface having a wired communication function.

The storage unit 28 is a storage device such as a hard disk or a memory (e.g., an SSD). The storage unit 28 stores, for example, displayed information management information, various types of data, various programs, the terminal address information of the terminal device 10, the server address information of the server 12, and the like. The storage unit 28 may store address information related to each user, the device address information of the device, information on the target identified by identification processing, and the like. They may be surely stored in separate storage devices or may be stored in a single storage device.

The displayed information management information stored in the storage unit 28 is the same information as the displayed information management information stored in the storage unit 20 of the terminal device 10.

The controller 30 has a function of controlling the operations of the respective parts of the server 12. The controller 30, for example, controls communication by the communication unit 26, writes data into the storage unit 28, reads data from the storage unit 28, and the like. The controller 30 also includes a specifying unit 32. The specifying unit 32 has the same function as the specifying unit 24 of the terminal device 10.

The displayed information management information may be stored in the storage unit 20 of the terminal device 10 or may be stored in the storage unit 28 of the server 12. When the displayed information management information is stored in the storage unit 20 of the terminal device 10, the displayed information management information may not be stored in the storage unit 28 of the server 12. When the displayed information management information is stored in the storage unit 28 of the server 12, the displayed information management information may not be stored in the storage unit 20 of the terminal device 10.

Also, when the specifying unit 24 is provided in the terminal device 10, the specifying unit 32 may not be provided in the server 12. Similarly, when the specifying unit 32 is provided in the server 12, the specifying unit 24 may not be provided in the terminal device 10.

The processing by the specifying unit may be performed by the terminal device 10 or by the server 12. For example, in a case where the specifying unit 24 is provided in the terminal device 10, when the displayed information management information is not stored in the storage unit 20 of the terminal device 10 but is stored in the storage unit 28 of the server 12, the specifying unit 24 of the terminal device 10 accesses the server 12 via the communication path N and refers to the displayed information management information stored in the server 12. When the displayed information management information is stored in both the storage unit 20 of the terminal device 10 and the storage unit 28 of the server 12, the specifying unit 24 of the terminal device 10 refers to the predetermined displayed information management information. When the displayed information management information is not stored in the storage unit 28 of the server 12 but is stored in the storage unit 20 of the terminal device 10, the specifying unit 24 of the terminal device 10 refers to the displayed information management information stored in the storage unit 20. The same is true when the specifying unit 32 of the server 12 executes processing.

Figure 4:
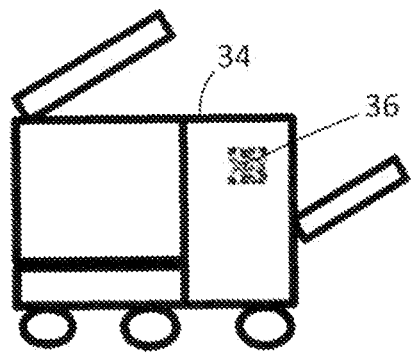
FIG. 4 is a schematic diagram illustrating an external appearance of an image forming apparatus.

Hereinafter, a target identification information acquisition processing will be described with reference to FIG. 4. FIG. 4 schematically illustrates an external view of the image forming apparatus 34 as an example of the apparatus. The image forming apparatus 34 is an apparatus having at least one function of, for example, a print function, a scan function, a copy function, and a facsimile function. Here, a description will be made of a processing for acquiring the device identification information as the target identification information of the image forming apparatus 34 using the marker type AR technology. A marker 36 such as a two-dimensional barcode is provided in the housing of the image forming apparatus 34. The marker 36 is information in which the device identification information of the image forming apparatus 34 is coded. When the user captures the marker 36 using the camera 18 provided in the terminal device 10, image data representing the marker 36 is generated. The specifying unit 24 of the terminal device 10 extracts the device identification information by applying a decoding processing to the marker image displayed in the corresponding image data. Thus, the image forming apparatus 34 is identified. Next, the specifying unit 24 specifies the displayed information associated with the extracted device identification information (target identification information) by referring to the management information for the image AR. The controller 22 of the terminal device 10 causes the displayed information to be displayed on the display unit of the UI unit 16. For example, in the management information for the image AR, the device identification information of the image forming apparatus 34 is associated with information indicating the state of the image forming apparatus 34, information indicating the function of the image forming apparatus 34, and the like as an example of displayed information, and such information is displayed on the display unit of the UI unit 16.

Further, the specifying unit 32 of the server 12 may extract the device identification information by applying a decoding processing to the image data representing the marker 36. In this case, the image data is transmitted from the terminal device 10 to the server 12, and the decoding processing is applied to the image data in the server 12. In addition, the specifying unit 32 of the server 12 may specify the displayed information. In this case, the displayed information is transmitted from the server 12 to the terminal device 10 and displayed on the display unit of the UI unit 16.

The marker 36 may include encoded information about the image forming apparatus 34 (e.g., information indicating a function of the image forming apparatus 34, etc.). In this case, by applying the decoding processing to the image data representing the marker 36, the device identification information of the image forming apparatus 34 is extracted and information indicating the function of the image forming apparatus 34 is also extracted.

When the device identification information is acquired by applying a marker-free AR technology, for example, the user captures a part or all of the external appearance of the target (e.g., the image forming apparatus 34) by the camera 18. Of course, it is helpful to obtain information for specifying a target such as the name of the image forming apparatus 34 (e.g., a product name), a model number, and an asset management number by capturing. The external image data representing a part or all of the external appearance of the image forming apparatus 34 is generated by capturing. The specifying unit 24 of the terminal device 10 identifies the image forming apparatus 34 based on the external image data. For example, the storage unit 20 of the terminal device 10 stores external image correspondence information indicating the correspondence between the external image data representing a part or all of the external appearance of the target and the target identification information of the target for each target. The specifying unit 24 compares the external image data generated by the capturing with each external image data included in the external image correspondence information, and specifies the target identification information of the image forming apparatus 34 based on the comparison result. For example, the specifying unit 24 extracts the external features of the image forming apparatus 34 from the external image data generated by the capturing, specifies the same or similar features as those of the external image data in an external image data group included in the external image correspondence information, and specifies the target identification information corresponding to the external image data. Thus, the image forming apparatus 34 captured by the camera 18 is identified. When the name of the image forming apparatus 34 (e.g., a product name), the model number thereof, or the like is captured and the external image data representing a name, a model number, or the like is generated, the image forming apparatus 34 may be identified based on the name, the model number, or the like displayed in the external image data. The specifying unit 24 specifies the displayed information associated with the target identification information by referring to the management information for the image AR. When the external image data is used as the target identification information, that is, when the external image data and the displayed information as the target identification information are associated with each other in the management information for the image AR, the specifying unit 24 may specify the displayed information associated with the external image data generated by the capturing by referring to the management information for the image AR. The controller 22 of the terminal device 10 may cause the displayed information to be displayed on the display unit of the UI unit 16.

Further, the specifying unit 32 of the server 12 may identify the target by comparing the external image data generated by the capturing with each external image data included in the external image correspondence information, and further specify the displayed information associated with the target. In this case, the displayed information is transmitted from the server 12 to the terminal device 10, and displayed on the display unit of the UI unit 16.

When the position AR technology is used, the specifying unit 24 of the terminal device 10 specifies the current position of the terminal device 10 (user) (e.g., latitude, longitude, etc.) using the GPS, the wireless communication, various sensors, and the like, and further specifies the azimuth toward which the camera 18 (user) is directed using a geomagnetic sensor, an acceleration sensor, a gyro sensor, or the like. Next, by referring to the information management information for position AR, the specifying unit 24 specifies the information displayed on the display unit based on the current position of the terminal device 10 (user), the position associated with each piece of displayed information, and the direction of the camera 18, and also specifies the display position of the displayed information. For example, when the distance between the terminal device 10 and the image forming apparatus 34 is equal to or less than a threshold value and the camera 18 is directed to the image forming apparatus 34, the specifying unit 24 specifies the displayed information associated with the installation position of the image forming apparatus 34 in the management information for the position AR. The controller 22 of the terminal device 10 may cause the displayed information to be displayed on the display unit of the UI unit 16.

Further, the specifying unit 32 of the server 12 may specify the displayed information displayed on the display unit based on the current position of the terminal device 10, the position associated with each piece of displayed information, and the direction of the camera 18. In this case, the displayed information is transmitted from the server 12 to the terminal device 10, and displayed on the display unit of the UI unit 16.

A target may be identified and the displayed information may be specified using multiple identification technologies. The target may be identified and the displayed information may be specified using multiple AR technologies selected from, for example, a marker type AR technology, a marker-free AR technology, and a position AR technology. Further, when it is not possible to identify the target or specify the displayed information by any AR technology, other AR technology may be used to identify the target and specify the displayed information. For example, when it is not possible to identify the target or specify the displayed information by the marker type AR technology or the marker-free AR technology, the displayed information may be specified using the position AR technology.

Hereinafter, the operation of the terminal device 10 will be described in detail with specific examples.

Specific Example 1

Figure 5:
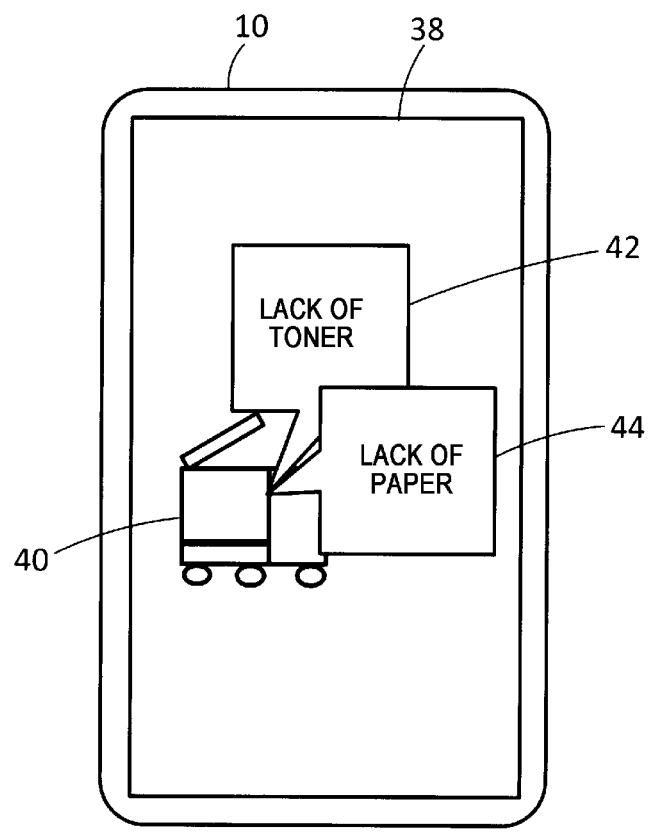
FIG. 5 is a diagram illustrating a screen.

A specific example 1 will be described with reference to FIG. 5. FIG. 5 illustrates an example of a screen displayed on the terminal device 10. The controller 22 of the terminal device 10 causes a screen 38 to be displayed on the display unit of the UI unit 16.

The displayed information specified by the AR technology is displayed on the screen 38. For example, when the image forming apparatus 34 is captured by the camera 18, the controller 22 causes the image 40 related to the image forming apparatus 34 to be displayed on the screen 38.

In a case where the camera 18 is directed toward the image forming apparatus 34 and a distance between the terminal device 10 and the image forming apparatus 34 is equal to or less than a threshold value when the position AR technology is used, the specifying unit 24 of the terminal device 10 specifies displayed information 42 and displayed information 44 associated with the installation position of the image forming apparatus 34 in the management information for the position AR.

When the marker 36 provided in the image forming apparatus 34 is captured by the camera 18 and the marker type AR technology is applied, the specifying unit 24 specifies the displayed information 42 and the displayed information 44 associated with the device identification information of the image forming apparatus 34 (target identification information) in the management information for the image AR. The same also applies when a part or all of the image forming apparatus 34 is captured by the camera 18 and a marker-free AR technology is applied.

The controller 22 causes the information 42 and the information 44 to be displayed on the screen 38. The displayed information 42 and the displayed information 44 are information indicating the state of the image forming apparatus 34 as an example. Specifically, the displayed information 42 is information indicating a state in which the toner mounted on the image forming apparatus 34 is insufficient, and the displayed information 44 is information indicating a state in which the sheets loaded in the image forming apparatus 34 are insufficient. Of course, displayed information indicating the function of the image forming apparatus 34 may be associated with the installation position of the image forming apparatus 34 to display the information indicating the function on the screen 38.

The image 40 may be an image generated by capturing the image forming apparatus 34 by the camera 18 (e.g., a frame in a photograph or a moving image), or may be an image schematically displaying the image forming apparatus 34 (e.g., an icon).

The controller 22 controls the display form of each piece of displayed information so that a part or the whole of each piece of the information is displayed on the screen 38. In the example illustrated in FIG. 5, the controller 22 controls the display mode of the information 42 and the information 44 in such a manner that a part or the whole of the information 42 is displayed on the screen 38 and a part or the whole of the information 44 is displayed on the screen 38. The controller 22 may cause the information 42 and the information 44 to be displayed on the screen 38 in such a manner that the displayed information 42 and the displayed information 44 do not overlap each other at all or in such a manner that the displayed information 42 and the displayed information 44 are partially overlap each other. That is, the controller 22 of the terminal device 10 controls the mode of display of plural pieces of displayed information in such a manner that any piece of displayed information is completely covered by other pieces of displayed information so as not to be seen by the user.

For example, the information 42 and the information 44 are displayed in a predetermined display area. That is, one display area is used for one piece of displayed information, and respective pieces of information are displayed in separate display areas. The display mode for each display area is controlled in such a manner that a part or all of the display area is displayed on the screen 38.

In addition, the controller 22 causes the information 42 and the information 44 to be displayed on the screen 38 in association with the image 40. For example, the controller 22 causes the information 42 and the information 44 to be displayed on the image 40 in a partially superimposed manner. In the example illustrated in FIG. 5, the information 42 and the information 44 are displayed in respective display areas each having a shape in the form of a chat bubble connected to the image 40, and each display area is displayed on the image 40 in a partially superimposed manner. Further, the shape is merely an example, and other shapes may be used. Also, the boundary of each display area itself may not be displayed, and only a character string indicated by displayed information may be displayed.

The controller 22 adjusts the display position of each of the displayed information 42 and the displayed information 44, the shape and size of each display area, the display size of the character string displayed in each display area, or the like so that a part or the whole of each of the information 42 and the information 44 is displayed on the screen 38. For example, the controller 22 causes the information to be displayed in a larger display area as the number of characters indicated by the information (e.g., the information 42) increases. At this time, when the whole of the other displayed information (e.g., the displayed information 44) is covered by a larger display area, the controller 22 of the terminal device 10 causes the information 42 to be displayed in a smaller display area by reducing the displayed size of the characters indicated by the information 42 so that at least a part of the other information (the information 44) is displayed without being covered. In this way, at least a part of each information is displayed on the screen 38.

In the example illustrated in FIG. 5, the information 44 is displayed on the information 42 in a partially superimposed manner. That is, the information 44 is displayed on the more front side than the information 42. In this case, when a user operates the UI unit 16 to designate the displayed information 42 (e.g., when the displayed information 42 is pressed on the screen 38), the controller 22 causes the information 42 to be displayed on the more front side than the information 44. In this way, the information designated by the user is displayed without being covered by other information.

Further, when the displayed information is designated by the user, the controller 22 may cause more detailed information about the displayed information to be displayed on the screen 38. For example, when the displayed information 44 (information indicating lack of paper) is designated by the user, the controller 22 causes more detailed information such as the size of sheets to be replenished or information indicating a tray to be filled to be displayed on the screen 38. For example, when the information displayed on the forefront side is designated by the user, the controller 22 may cause more detailed information about the displayed information to be displayed on the screen 38. As another example, when the displayed information is designated by the user over a predetermined period of time (so-called long press), regardless of whether the information is displayed on the forefront side, the controller 22 may cause more detailed information about the displayed information to be displayed on the screen 38. The controller 22 acquires detailed information from the target (e.g., the image forming apparatus), the server 12, or the like.

Further, plural pieces of information may be displayed in one display area (e.g., a chat bubble area). Even in this case, the size and arrangement of the characters in the display area are adjusted so that at least a part of each piece of information is displayed.

In the example illustrated in FIG. 5, information relating to one target (e.g., the image forming apparatus 34) is displayed. However, when plural targets are identified, information about each of the plural targets is displayed on the screen 38. The plural targets may be the same type of targets or different types of targets. For example, when the image forming apparatus 34 and the PC are identified as targets by applying the marker type AR technology, the controller 22 causes the information associated with the image forming apparatus 34 (e.g., the information 42 and the information 44) and the information associated with the PC to be displayed on the screen 38. In addition, the image forming apparatus 34 is identified by the marker type AR technology, the displayed information associated with the image forming apparatus 34 is specified, and further, the displayed information associated with the surrounding building, etc., is specified by the position AR technology, the controller 22 causes the information associated with the image forming apparatus 34 and the information associated with the surrounding building or the like to be displayed on the screen 38. Even in such a case, the controller 22 controls the display mode of each information so that at least a part of each information is displayed on the screen 38.

As described above, according to the specific example 1, since each information is displayed without being completely covered by other information or images, at least a part of each displayed information is provided to the user.

The controller 22 may cause the information to be displayed on the display unit of the UI unit 16 and output the displayed information as voice information. For example, a voice based on the voice information is generated from a speaker.

Further, displayed information may be associated with each part of the target. The correspondence is registered in the displayed information management information. In this case, the specifying unit 24 identifies the part of the target by the image AR technology, and specifies the displayed information associated with the part. The controller 22 causes the information to be displayed on the screen 38 in association with the image related to the part. For example, the image forming apparatus 34 includes a main body, an automatic document feeder, and a post-processing apparatus. It is assumed that the main body is associated with displayed information indicating, for example, a print function, the automatic document feeder is associated with displayed information indicating a scan function, and the post-processing apparatus is associated with displayed information indicating a staple function. When the main body of the image forming apparatus 34 is identified by the image AR technology, the specifying unit 24 specifies displayed information associated with the main body (information indicating a print function), and the controller 22 causes the information to be displayed on the screen 38. In this way, by associating the displayed information with each part, it is possible to provide the user with a different piece of displayed information for each identified part even when the same target is captured.

Specific Example 2

Figure 6:
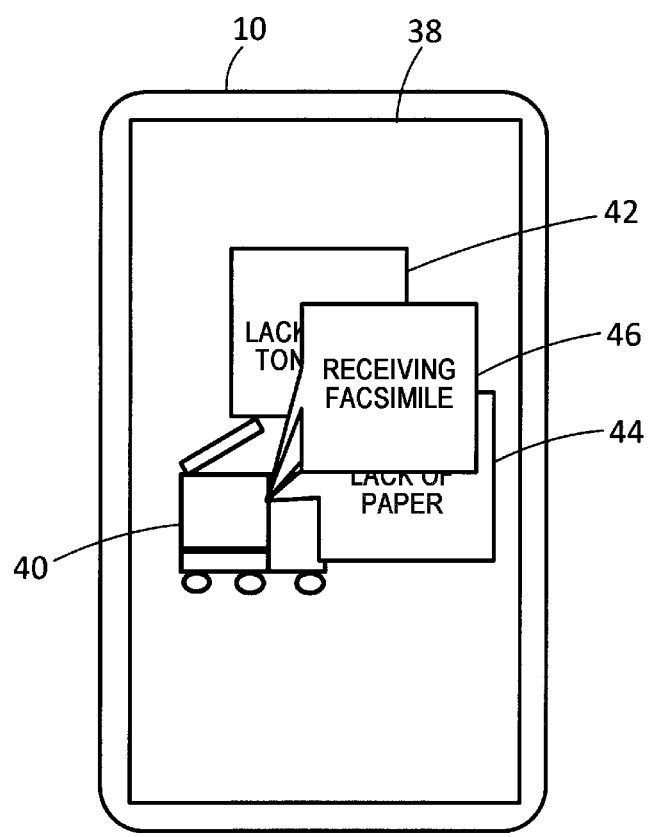
FIG. 6 is a diagram illustrating the screen.

A specific example 2 will be described with reference to FIG. 6. FIG. 6 illustrates a screen. For example, when the displayed information 46 is completely covered by the displayed information 42 and the displayed information 44 so that the whole of the information 46 is not displayed at all, the controller 22 of the terminal device 10 causes at least a part of each of the information 42, the information 44, and the information 46 to be displayed on the screen 38 by shifting the display position of the each of the information 42, the information 44, and the information 46. Further, the displayed information 46 is information indicating that the image forming apparatus 34 is receiving a facsimile.

For example, when the image forming apparatus 34 does not receive a facsimile, the controller 22 causes the information 42 and the information 44 to be displayed on the screen 38 as illustrated in FIG. 5. In this state, when the image forming apparatus 34 starts receiving a facsimile, the specifying unit 24 of the terminal device 10 acquires the information 46 indicating the facsimile reception as the displayed information indicating the state of the image forming apparatus 34, and the controller 22 causes the information 46 to be displayed on the screen 38 in addition to the information 42 and the information 44. Further, the displayed information 46 indicating the state of the image forming apparatus 34 is registered in the displayed information management information, and the specifying unit 24 acquires the displayed information 46 from the displayed information management information. The controller 22 adjusts the position of display of the information 42, the information 44, and the information 46 so that at least a part of the each of the information 42, the information 44, and the information 46 is displayed on the screen 38. The controller 22 may also adjust the size of display of the characters indicated by each information so that at least a part of the each of the information 42, the information 44, and the information 46 is displayed on the screen 38.

As described above, each information is displayed without being completely covered by other displayed information or images by shifting the position of display of each information.

Also, in the specific example 2, when the user operates the UI unit 16 to designate the displayed information, the controller 22 causes the information designated by the user to be displayed on the more front side than the other displayed information. For example, when a part of the displayed information 44 is covered by the displayed information 46, the user may designate the information 44 so that the information 44 is displayed on the more front side than the other displayed information. That is, the information 44 is displayed without being covered by other displayed information.

Specific Example 3

Figure 7:
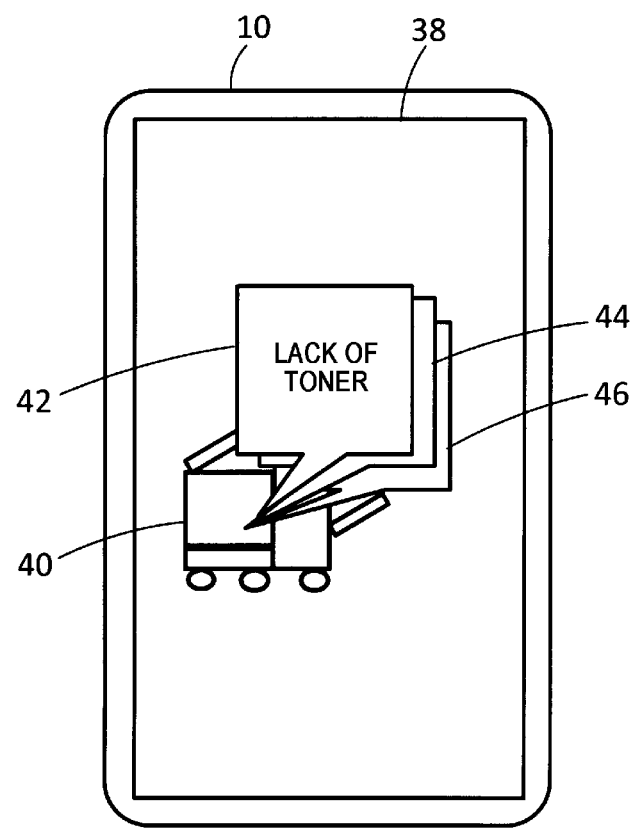
FIG. 7 is a diagram illustrating the screen.

A specific example 3 will be described with reference to FIG. 7. FIG. 7 illustrates a screen. In the example illustrated in FIG. 7, the controller 22 of the terminal device 10 displays the whole of one piece of information (e.g., the information 42) on the screen 38 and displays a part of the other information (e.g., the information 44 and the information 46) on the back side of the information 42 so as to be displayed on the screen 38. That is, the controller 22 overlaps the displayed information 42 on the displayed information 42 and the displayed information 44, and shifts the position of display of each information to display the information 42, the information 44, and the information 46 on the screen 38 so that a part of the each of the information 44 and the information 46 is displayed on the screen 38. More specifically, the information 44 is displayed on the information 46 in a superimposed manner so that a part of the information 46 is displayed, and the information 42 is displayed on the displayed information 44 in a superimposed manner so that a part of the information 44 is displayed. In this way, plural pieces of information are displayed in a superimposed manner while gradually changing the display position.

For example, when the user operates the UI unit 16 to designate the information displayed on the forefront side (e.g., the displayed information 42), the controller 22 causes the information 44 displayed one below the information 42 to be displayed on the forefront side and the information 42 to be displayed below the information 46. Similarly, when the user designates the information 44 displayed on the forefront side, the controller 22 causes the information 46 displayed one below the information 44 to be displayed on the forefront side. In this way, each piece of displayed information is provided to the user and the whole of a specific piece of displayed information is provided to the user by a simple operation. Further, when the user designates the information displayed on the forefront side for a predetermined time or longer, the controller 22 may cause detailed information about the displayed information to be displayed on the screen 38.

In the specific examples 1 to 3, the controller 22 may change the display mode according to the priority of each displayed information. For example, the controller 22 causes the higher priority information to be displayed on the more front side. In the example illustrated in FIG. 6, it is assumed that the priority of the displayed information 42 is the highest (number 1), the priority of the displayed information 44 is number 2, and the priority of the displayed information 46 is number 3. In this case, the controller 22 causes the information 42 to be displayed on the forefront side, a part of the information 44 to be displayed under the information 42 so as to be covered by the information 42, and a part of the information 46 to be displayed under the information 44 so as to be covered by the information 42 and the information 44.

The priority may be determined, for example, by the user, based on the history of display of each information, or based on the degree of urgency. For example, a higher priority may be given to the information with a higher number of display times within a predetermined time period. In addition, as the number of times of the displayed information designated by the user within the predetermined period becomes higher, the higher priority may be given. Further, when a predetermined emergency event occurs (e.g., when a device malfunctions), the priority of the displayed information indicating that the predetermined emergency event occurs may become the highest.

By displaying high-priority information on the low-priority information in a superimposed manner as described above, high-priority displayed information is provided to the user in a more visible manner compared to low-priority displayed information.

Specific Example 4

Figure 8:
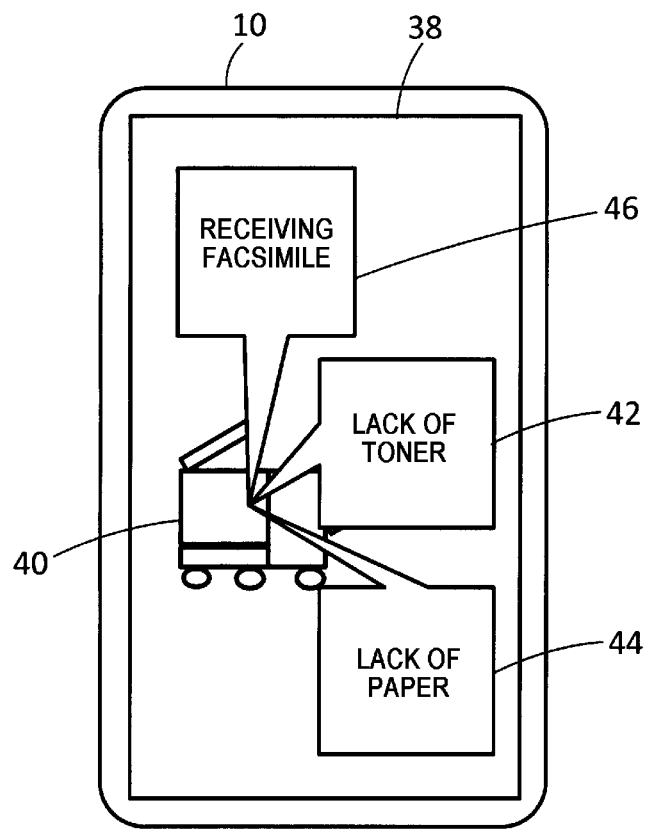
FIG. 8 is a diagram illustrating the screen.

A specific example 4 will be described with reference to FIG. 8. FIG. 8 illustrates a screen. In the example illustrated in FIG. 8, the controller 22 of the terminal device 10 causes the respective pieces of information (e.g., the information 42, the information 44, and the information 46) to be displayed on the screen 38 so that the respective pieces of displayed information (e.g., the displayed information 42, the displayed information 44, and the displayed information 46) are not overlapped with each other. The controller 22 adjusts the position of each display area, the size of display of the characters indicated by each displayed information, and the shape and size of the display area to display the each piece of information on the screen 38 so that the pieces of displayed information are not overlapped with each other. In this way, each piece of displayed information is entirely provided to the user.

Specific Example 5

Figure 9:
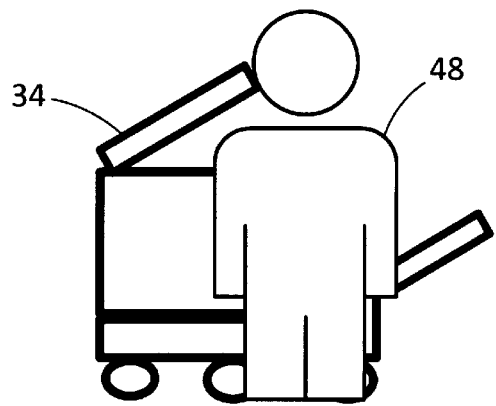
FIG. 9 is a schematic diagram illustrating an image forming apparatus and a user.
Figure 10:
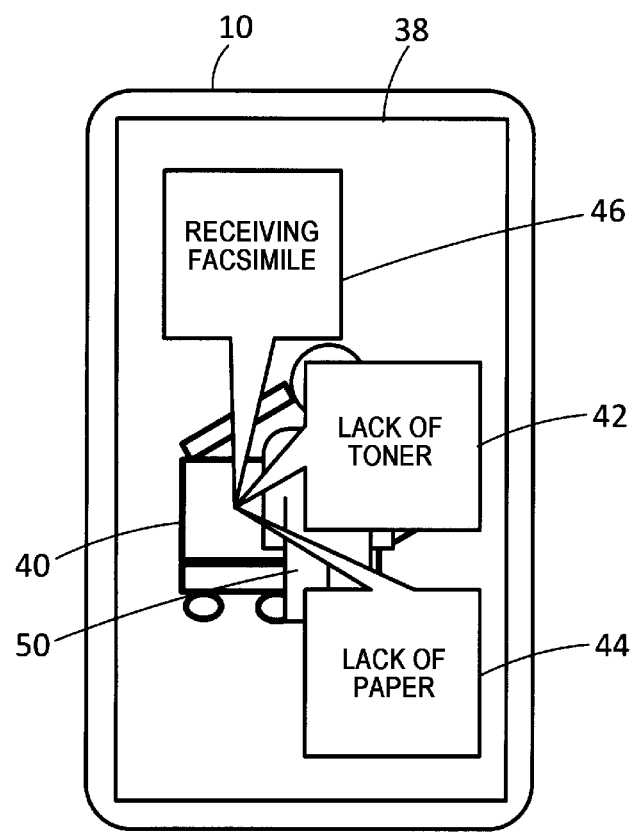
FIG. 10 is a diagram illustrating a screen.

A specific example 5 will be described with reference to FIGS. 9 and 10. FIG. 9 schematically illustrates the image forming apparatus 34 and a person 48. FIG. 10 illustrates a screen. When a new image is additionally displayed on the screen 38 while the information is displayed, the controller 22 of the terminal device 10 causes the information to be displayed on the more front side than the new image. For example, as illustrated in FIG. 9, the person 48 (an example of an obstacle) exists between the image forming apparatus 34 and the terminal device 10, and the person 48 is captured by the camera 18 together with the image forming apparatus 34. In this case, when the displayed information associated with the person 48 is not registered in the displayed information management information, the controller 22 causes the information 42, the information 44, and the information 46 associated with the image forming apparatus 34 to be displayed on the more front side than an image 50 related to the person 48, as illustrated in FIG. 10. That is, the controller 22 displays the information 42, the information 44, and the information 46 on the image 50 in a superimposed manner.

As described above, by displaying the information on the more front side than other images that are not related to the displayed information, even when other images are displayed, the displayed information is provided to the user without being blocked by other images.

Further, when the displayed information associated with the person 48 is registered in the displayed information management information, the controller 22 causes the information to be displayed on the screen 38. In this case, the controller 22 controls the mode of display of each piece of information so that the information and at least a part of each of the information 42, the information 44, and the information 46 are displayed on the screen 38.

Specific Example 6

Figure 11:
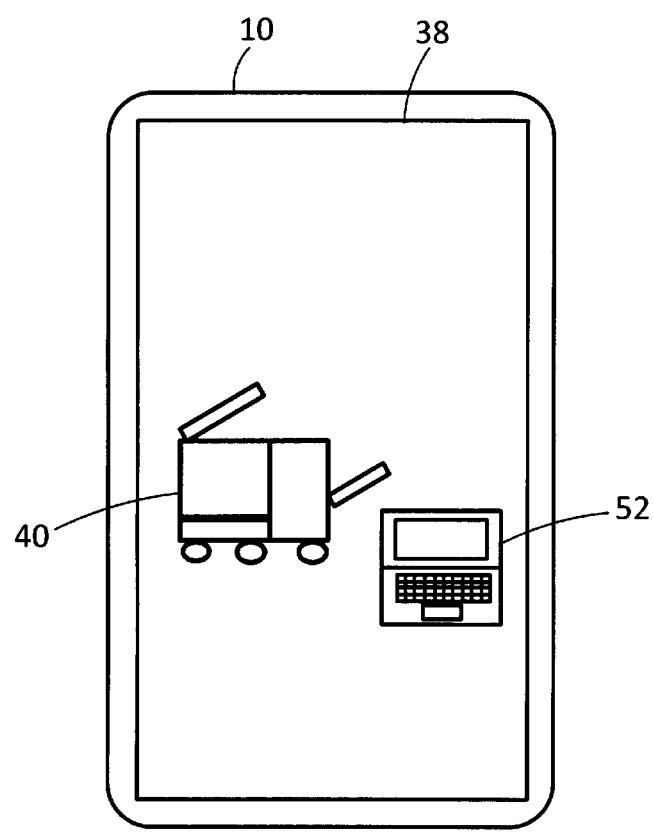
FIG. 11 is a diagram illustrating the screen.
Figure 12:
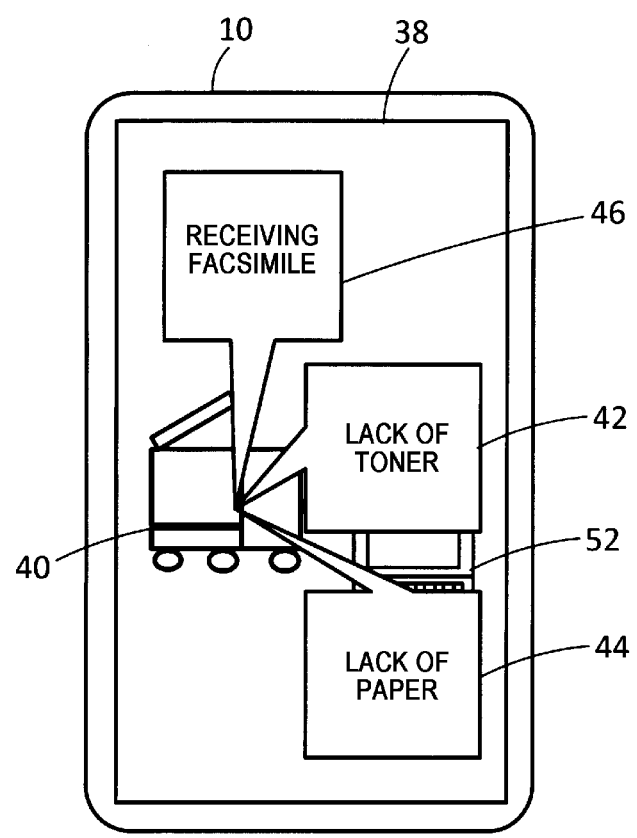
FIG. 12 is a diagram illustrating the screen.

A specific example 6 will be described with reference to FIGS. 11 and 12. FIGS. 11 and 12 illustrate a screen. For example, the image forming apparatus and the PC are captured by the camera 18, and the displayed information associated with the image forming apparatus (or the installation position of the image forming apparatus) and the displayed information associated with the PC (or the installation position of the PC) are specified by the image AR technology or the position AR technology. Further, as illustrated in FIG. 11, an image 40 related to the image forming apparatus and an image 52 related to the PC are displayed on the screen 38. In addition, the image 52 may be an image generated by capturing the PC with the camera 18 (e.g., a frame in a photograph or a moving image) or an image schematically representing the PC (e.g., an icon).

In the specific example 6, information related to a particular target in plural pieces of information is displayed on the display unit of the UI unit 16. The particular target may be, for example, a target designated by the user or may be predefined. Here, the image forming apparatus is designated as a particular target. In this case, as illustrated in FIG. 12, the controller 22 does not cause the information associated with the PC to be displayed on the screen 38, but causes the information 42, the information 44, and the information 46 associated with the image forming apparatus to be displayed on the screen 38. Since the information about the targets other than the particular target is not displayed, it provides the user with more easily viewable displayed information about the particular target compared with a case where the information about the targets other than the particular target is also displayed.

In the specific example 6, as in the specific examples 1 to 5, the controller 22 of the terminal device 10 displays the information 42, the information 44, and the information 46 associated with the image forming apparatus as the particular target on the image 40 related to the image forming apparatus in a partially superimposed manner, and controls the mode of display of the information 42, the information 44, and the information 46 so that a part or the whole of the information 42, the information 44, and the information 46 is displayed on the screen 38. In the example illustrated in FIG. 12, as in the example illustrated in FIG. 8, the whole of each piece of information is displayed on the screen 38. Of course, as illustrated in FIGS. 5 to 7, the respective pieces of information may be partially displayed on the screen 38 in such a manner that the pieces of displayed information are partially overlapped with each other.

Further, the particular target may be changed by the user. For example, in a case where the information 42, the information 44, and the information 46 related to the image forming apparatus are displayed on the screen 38, when the user operates the UI unit 16 to designate the image 52 related to the PC, the controller 22 identifies the PC as the particular target and causes the information associated with the PC to be displayed on the screen 38 without displaying the information 42, the information 44, and the information 46.

In addition, plural particular targets may be determined. For example, when a mode for selecting a particular target is executed and the user designates multiple targets, the multiple targets are identified as particular targets. For example, when the image forming apparatus and the PC are designated by the user, the image forming apparatus and the PC are identified as particular targets, and the information 42, the information 44, and the information 46 associated with the image forming apparatus and the information associated with the PC are displayed on the screen 38.

Specific Example 7

In the specific example 7, the controller 22 of the terminal device 10 causes the display unit of the UI unit 16 to display the information associated with a place on which the camera 18 fixes the focus (a place in focus). For example, in the example illustrated in FIG. 11, when the focus is fixed on the image forming apparatus and the focus is not fixed on the PC, the controller 22, as illustrated in FIG. 12, does not cause the information associated with the PC to be displayed on the screen 38, but causes the information 42, the information 44, and the information 46 associated with the image forming apparatus to be displayed on the screen 38. In this case, the controller 22 also causes the displayed information 42, the displayed information 44, the displayed information 46 to be partially overlapped on the image 40 related to the image forming apparatus, and controls the mode of display of the information 42, the information 44, and the information 46 so that a part or the whole of each of the information 42, the information 44, and the information 46 is displayed on the screen 38. Further, the displayed information associated with the image forming apparatus is specified by the position AR technology or the image AR technology. The place on which the camera 18 fixes the focus should be the place in which the user is interested. Therefore, by displaying the information associated with the place on which the focus is fixed without displaying the information associated with the place on which the focus is not fixed, the displayed information which is suggested to be of interest to the user is provided to the user.

Specific Example 8

Figure 13:
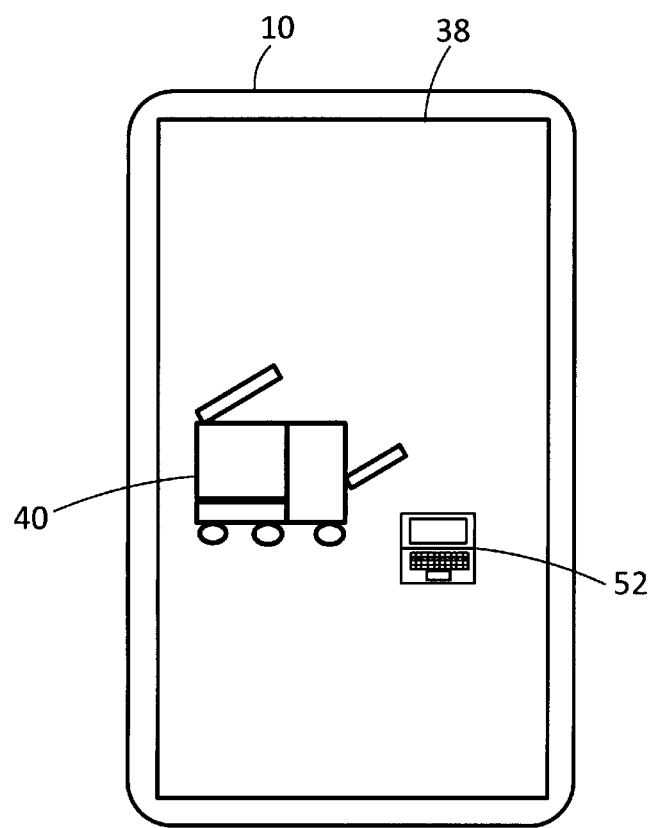
FIG. 13 is a diagram illustrating the screen.

Specific example 8 will be described with reference to FIGS. 13 to 16. FIGS. 13 to 16 illustrate a screen. For example, the image forming apparatus and the PC are captured by the camera 18, and the displayed information associated with the image forming apparatus (or the installation position of the image forming apparatus) and the displayed information associated with the PC (or the installation position of the PC) are specified by the image AR technology or the position AR technology. Further, as illustrated in FIG. 13, the image 40 related to the image forming apparatus and the image 52 related to the PC are displayed on the screen 38.

In the specific example 8, when plural targets are displayed on the screen 38, the controller 22 of the terminal device 10 changes the mode of display of each piece of information in accordance with the relationship between the sizes of the images related to the respective targets. For example, the controller 22 causes the information about the target related to the larger image to be displayed on the screen 38 in preference to the information about the target related to the smaller image. More specifically, the controller 22 displays the information about the target related to the larger image on the more front side or to be larger than the information about the target related to the smaller image. The size of the image is determined, for example, on the screen 38 based on the area occupied by the image and the number of pixels. Further, the image forming apparatus corresponds to an example of a first target, and the PC corresponds to an example of a second target. Also, the image 40 corresponds to an example of a first image, and the image 52 corresponds to an example of a second image.

Figure 14:
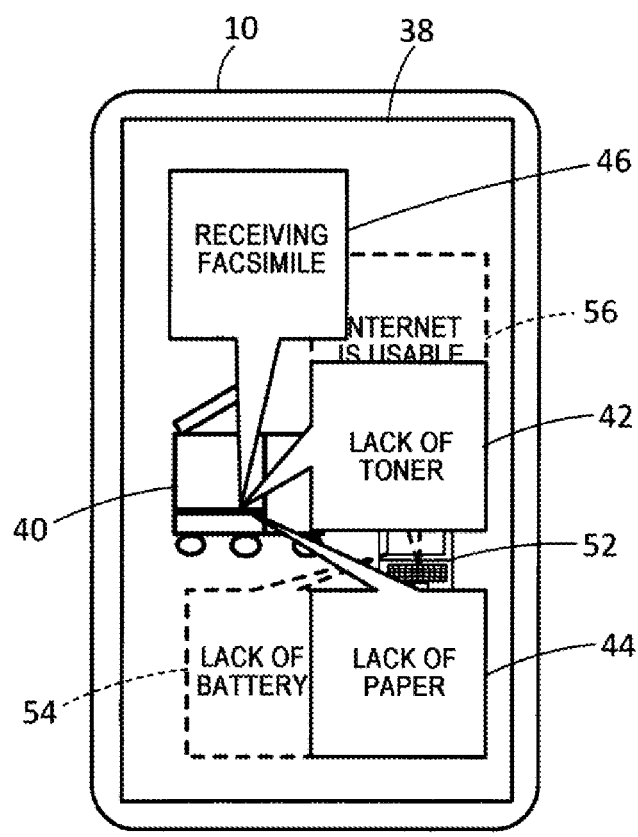
FIG. 14 is a diagram illustrating the screen.

In the example illustrated in FIG. 13, since the image 40 is larger than the image 52, the controller 22 compares the displayed information about the image forming apparatus related to the image 40 with the displayed information about the PC related to the image 52, and causes the information about the PC related to the image 52 to be preferentially displayed on the screen 38. For example, as illustrated in FIG. 14, the controller 22 causes the information 42, the information 44, and the information 46 associated with the image forming apparatus to be displayed on the more front side than the displayed information 54 and the displayed information 56 associated with the PC. In the example illustrated in FIG. 14, the displayed information 44 associated with the image forming apparatus is partially superimposed on the displayed information 54 associated with the PC, and a part of the displayed information 54 is covered by the displayed information 44. Further, the displayed information 42 and the displayed information 46 associated with the image forming apparatus are partially superimposed on the displayed information 56 associated with the PC, and a part of the displayed information 56 is covered by the displayed information 42 and the displayed information 46.

Further, the controller 22 may cause the size of display of the character string indicated by the information 42, the information 44, and the information 46 to be displayed larger than the size of display of the character string indicated by the information 54 and the information 56, and make the size of display of the information 42, the information 44, and the information 46 be larger than the size of display of the information 54 and the information 56.

Also, in the specific example 8, the controller 22 controls the mode of display of each information so that at least a part of each information is displayed. In the example illustrated in FIG. 14, each of the information 42, the information 44, and the information 46 associated with the image forming apparatus is entirely displayed on the screen 38, and the information 54 and the information 56 associated with the PC are partially displayed and covered by the displayed information 42, the displayed information 44, and the displayed information 46. Of course, the displayed information 42, the displayed information 44, and the displayed information 46 may be partially superimposed on each other.

Figure 15:
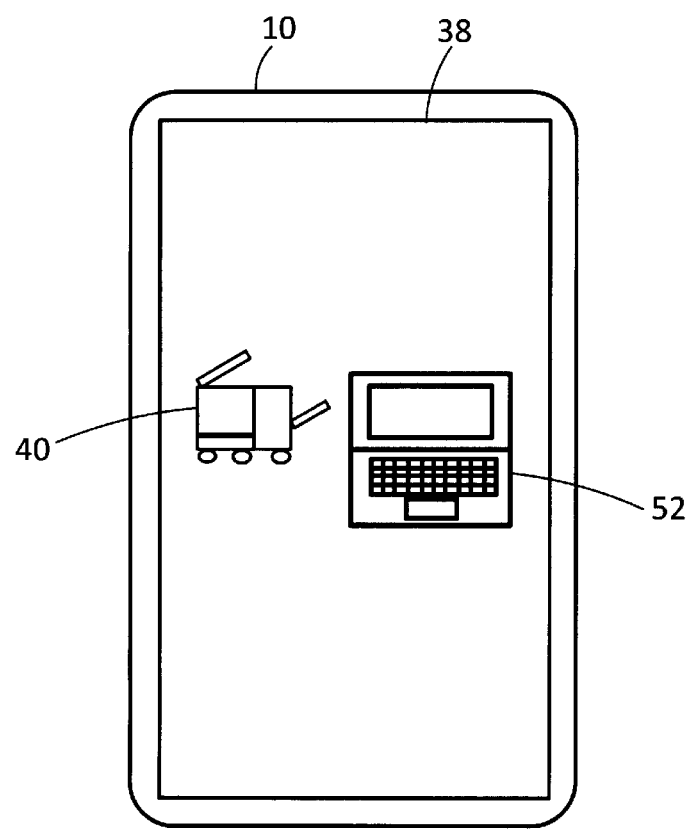
FIG. 15 is a diagram illustrating the screen.
Figure 16:
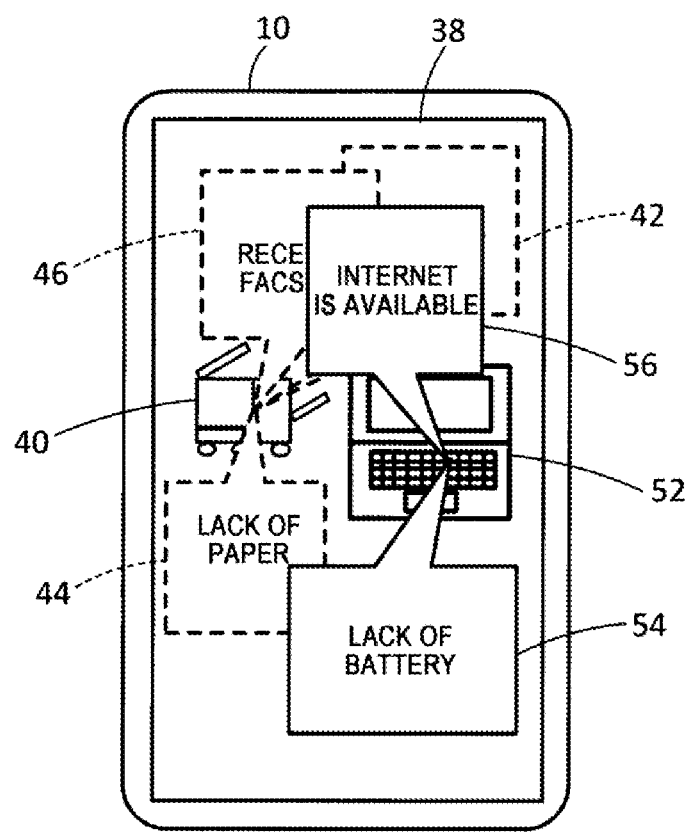
FIG. 16 is a diagram illustrating the screen.

FIG. 15 illustrates another example. In the example illustrated in FIG. 15, since the image 52 is larger than the image 40, the controller 22 compares the information about the PC related to the image 52 with the information about the image forming apparatus related to the image 40, and causes the information about the PC related to the image 52 to be preferentially displayed on the screen 38. For example, as illustrated in FIG. 16, the controller 22 causes the information 54 and the information 56 associated with the PC to be displayed on the more front side than the displayed information 42, the displayed information 44, and the displayed information 46 associated with the image forming apparatus. In the example illustrated in FIG. 16, the displayed information 54 associated with the PC is partially superimposed on the displayed information 44 associated with the image forming apparatus, and a part of the displayed information 44 is covered by the displayed information 54. Further, the displayed information 56 associated with the PC is partially superimposed on the displayed information 42 and the displayed information 46 associated with the image forming apparatus, and the each of the displayed information 42 and the displayed information 46 is covered by the displayed information 56.

Further, the controller 22 may cause the size of display of the character string indicated by the information 54 and the information 56 to be displayed larger than the size of display of the character string indicated by the information 42, the information 44, and the information 46, or may make the size of the area of display of the information 54 and the information 56 be larger than the size of the area of display of the information 42, the information 44, and the information 46.

In the example illustrated in FIG. 16, each of the information 54 and the information 56 associated with the PC is entirely displayed on the screen 38, and the information 42, the information 44, and the information 46 associated with the image forming apparatus are partially displayed and covered by the displayed information 54 and the displayed information 56. Of course, the displayed information 54 and the displayed information 56 may be partially overlapped with each other.

The user may operate the UI unit 16 to change the size of the image displayed on the screen 38. In this case, the mode of display of the information is controlled depending on the change. For example, in the example illustrated in FIG. 15, when the user operates the UI unit 16 to make the image 40 related to the image forming apparatus be larger than the image 52 related to the PC, the controller 22 causes the information associated with the image forming apparatus to be displayed on the screen 38 in preference to the information associated with the PC. By this simple operation, the information about the target desired by the user is preferentially displayed.

Further, the specific example 6 and the specific example 8 may be combined. For example, the controller 22 may identify the target related to the largest image as a particular target and cause the information associated with the particular target to be displayed on the screen 38 without causing the information associated with the targets other than the particular target to be displayed on the screen 38.

Specific Example 9

In the specific example 9, the controller 22 of the terminal device 10 changes the mode of display of the information according to a positional relationship between the user (the terminal device 10) and each target. For example, the controller 22 compares the information associated with the target closer to the user with the information associated with the target farther from the user, and causes the information associated with the target closer to the user to be preferentially displayed on the screen 38.

For example, when the distance between the user and the image forming apparatus is shorter than the distance between the user and the PC, as illustrated in FIG. 14, the controller 22 causes the information 42, the information 44, and the information 46 associated with the image forming apparatus to be displayed on the more front side than the displayed information 54 and the displayed information 56 associated with the PC. In the meantime, when the distance between the user and the PC is shorter than the distance between the user and the image forming apparatus, as illustrated in FIG. 16, the controller 22 causes the information 54 and the information 56 associated with the PC to be displayed on the more front side than the displayed information 42, the displayed information 44, and the displayed information 46 associated with the image forming apparatus.

In addition, the controller 22 may cause the size of display of the character string indicated by the information associated with the target closer to the user to be displayed larger than the size of display of the character string indicated by the information associated with the target farther from the user, and may cause the size of the area of display of the information associated with the target closer to the user to be displayed larger than the size of the area of display of the information associated with the target farther from the user.

According to the concrete example 9, the displayed information associated with the target closer to the user is provided to the user in a more visible display mode.

Specific Example 10

Figure 17:
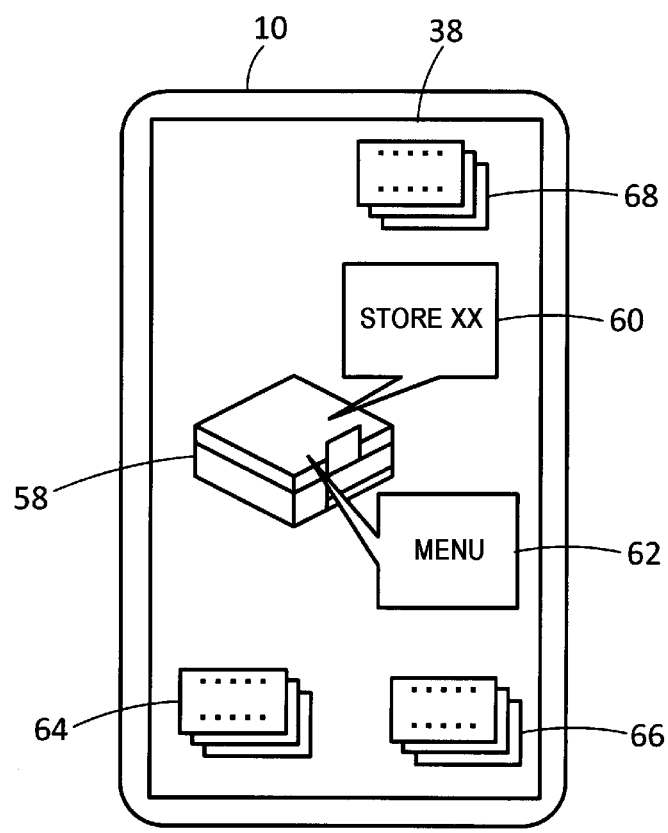
FIG. 17 is a diagram illustrating the screen.

A specific example 10 will be described with reference to FIG. 17. FIG. 17 illustrates a screen. For example, the image AR technology or the position AR technology specifies displayed information associated with a store (or store location). Also, as illustrated in FIG. 17, an image 58 related to the store is displayed on the screen 38.

The controller 22 of the terminal device 10 causes the information 60 and the information 62 associated with the store to be displayed on the screen 38. Displayed information 60 is information indicating a store name, and displayed information 62 is information indicating a menu provided in the store. For example, when the user operates the UI unit 16 to designate the displayed information 60, the controller 22 causes detailed information such as a contact address and a map to be displayed on the screen 38. Further, when the user operates the UI unit 16 to designate the displayed information 62, the controller 22 causes detailed information on the menu to be displayed on the screen 38. In the example illustrated in FIG. 17, as in the example illustrated in FIG. 8, each of the information 60 and the information 62 is entirely displayed on the screen 38.

In the specific example 10, the controller 22 acquires information about the target (e.g., a store) (related pieces of information) by one or more applications (software), and causes the related pieces of information to be displayed as displayed information on the screen 38. For example, the controller 22 may acquire information about the target using the Internet, or may acquire information about the target using the social networking service (SNS).

In the example illustrated in FIG. 17, the controller 22 acquires the information related to the store. For example, the controller 22 may use a Web browser to search for a Web site on the Internet related to the store and to retrieve information related to the store from the Web site (e.g., other users' comments on the store (reputation, so-called word-of-mouth) or the like). Further, the controller 22 may use an SNS application to acquire related pieces of information about the store (e.g., other users' comments) from the SNS.

The controller 22 acquires related pieces of information for each application and causes the related pieces of information to be displayed as displayed information on the screen 38. A displayed information group 64 is a group of related pieces of information about the store that are acquired from a certain Web site. A displayed information group 66 is a group of related pieces of information about the store that are acquired from the SNS (referred to as SNS(A)) using an SNS application A. A displayed information group 68 is a group of related pieces of information about the store that are acquired from a separate SNS (SNS (B)) using a separate SNS application B. The displayed information groups 64, 66, and 68 each include one or more pieces of displayed information. One piece of displayed information includes information such as a comment or reputation. The controller 22 may cause information indicating the number of pieces of information included in the information group to be displayed on the screen 38.

The controller 22 integrates the related pieces of information for each application and causes the related pieces of information to be displayed on the screen 38. For example, the controller 22 causes the pieces of displayed information to be partially overlapped with each other on the screen 38, while shifting the position of display of each information included in the information group 64. When the user operates the UI unit 16 to designate the displayed information illustrated on the forefront side, the controller 22 causes the information displayed under the displayed information to be displayed on the forefront side. The information originally displayed on the forefront side is displayed on the back side. The same also applies to the displayed information groups 66 and 68.

The controller 22 may cause only one piece of information included in the information group 64 to be displayed as representative information on the screen 38. When the user operates the UI unit 16 to designate the representative displayed information, the controller 22 causes other information included in the information group 64 to be displayed as representative information on the screen 38 in place of the original representative information.

Further, the controller 22 may integrate the related pieces of information for each Web site and causes the related pieces of information to be displayed on the screen 38.

According to the specific example 10, related pieces of information other than the information associated with the target are provided to the user.

Specific Example 11

Figure 18:
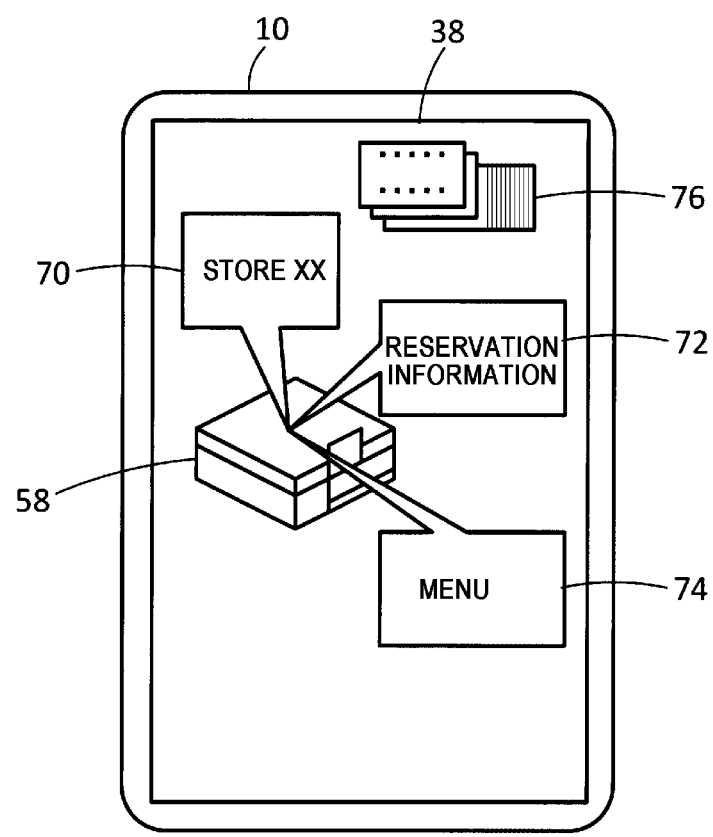
FIG. 18 is a diagram illustrating the screen.
Figure 19:
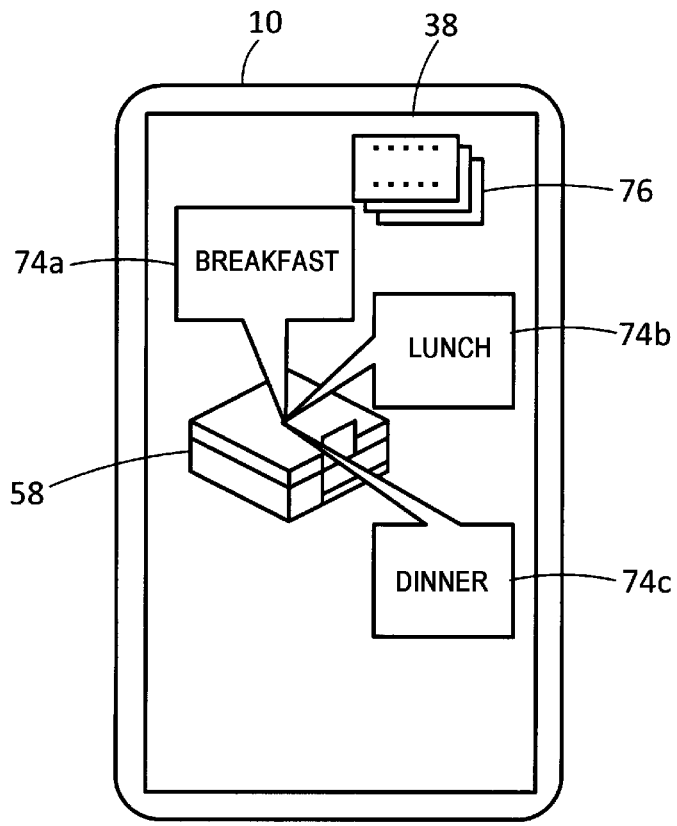
FIG. 19 is a diagram illustrating the screen.

A specific example 11 will be described with reference to FIGS. 18 and 19. FIGS. 18 and 19 illustrate a screen. For example, the image AR technology or the position AR technology specifies displayed information associated with a store (or store location). Further, as illustrated in FIGS. 18 and 19, an image 58 related to the store is displayed on the screen 38.

In the specific example 11, the controller 22 of the terminal device 10 changes the displayed information according to the positional relationship between the user (the terminal device 10) and the target, and causes the changed information to be displayed on the screen 38. For example, when the distance between the user and the target is less than a threshold value, the controller 22 causes more detailed information to be displayed as displayed information on the screen 38, as compared with a case where the distance between the user and the target is equal to or greater than the threshold value. The threshold value is a predetermined value and may be changed by the user, the administrator, or the like.

When the distance between the user and the store as the target is equal to or greater than the threshold value, the controller 22 causes information 70, information 72, and information 74 associated with the store to be displayed on the screen 38 as illustrated in FIG. 18. The displayed information 70, the displayed information 72, and the displayed information 74 are general information about the store. For example, the displayed information 70 is information indicating a store name, the displayed information 72 is information indicating an outline of the store reservation, and the displayed information 74 is information indicating an outline of the menu provided in the store. For example, when the user operates the UI unit 16 to designate the displayed information 70, the controller 22 causes the contact information of the store, the map, and the like to be displayed as detailed information on the screen 38. Further, when the user designates the displayed information 72, the controller 22 causes detailed information on the reservation (e.g., information indicating the reservation status of each month, etc.) to be displayed on the screen 38. When the user designates the displayed information 74, the controller 22 causes detailed information on the menu (e.g., a menu for breakfast, a menu for lunch, and a menu for diner) to be displayed on the screen 38. When the user is located far away from the store, the user may check the availability of a seat by phone or check the reservation status. Thus, the summary information above serves as a confirmation. In addition, the controller 22 may cause information 76 related to the store, which is acquired using the Internet or the SNS, to be displayed on the screen 38.

When the distance between the user and the store is less than the threshold value, the controller 22 causes information 74a, information 74b, and information 74c associated with the store to be displayed on the screen 38 as illustrated in FIG. 19. The displayed information 74a, the displayed information 74b, and the displayed information 74c are detailed information about the store, and are examples of detailed information about the menu. The displayed information 74a is information indicating a menu for breakfast, the displayed information 74b is information indicating a menu for lunch, and the displayed information 74c is information indicating a menu for dinner. It is assumed that as the user is closer to the store, the user is more likely to use the store. Therefore, by displaying more detailed information (e.g., detailed information of a menu), more significant information is provided to the user than when the general information is displayed.

According to the specific example 11, when the distance between the user and the target is equal to or greater than the threshold value, general information is displayed. When the distance is less than the threshold value, more detailed information is displayed. This provides the user with significant information in accordance with the user's position.

When the user operates the UI unit 16 to give a switching instruction, the controller 22 may switch between the display of the summary information and the display of the detailed information according to the instruction. For example, when the distance between the user and the store is less than the threshold value, the controller 22 causes the detailed information to be displayed on the screen 38. When the user gives the switching instruction, the controller 22 causes the summary information to be displayed on the screen 38. The same also applies when the distance between the user and the store is equal to or greater than the threshold value.

The specific example 11 describes a store as an example. However, even when the target is a device, the same display control is performed. For example, when the distance between the user and the image forming apparatus is equal to or greater than the threshold value, the controller 22 causes the information indicating the state of the image forming apparatus (e.g., during copying, during sleep, or the like) to be displayed on the screen 38. In the meantime, when the distance between the user and the image forming apparatus is less than the threshold value, the controller 22 causes the information indicating the function of the image forming apparatus (e.g., a copy function or a scan function) to be displayed on the screen 38.

According to the first exemplary embodiment, even when plural pieces of information associated with a specific position or a specific image are simultaneously displayed on the screen 38, at least a part of each information is displayed, so that any information not displayed (any information with even a part not displayed) is prevented from occurring. For example, even when the amount of the displayed information associated with a specific position or a specific image increases, the use of the AR technology prevents the occurrence of any information not displayed. It is also not necessary to limit the amount of information displayed at the same time in order to prevent the occurrence of any information not displayed.

Second Exemplary Embodiment

Hereinafter, a second exemplary embodiment will be described. In the second exemplary embodiment, the controller 22 of the terminal device 10 controls the display of the information according to the position of the user (the terminal device 10). For example, the controller 22 may change the content and mode of display of the information according to the user's position.

Specifically, when the displayed information related to a specific position (e.g., the position of the target) is specified using the position AR technology, the controller 22 changes the content and mode of display of the information according to the user's position. For example, the controller 22 changes the content and mode of display of the information according to the positional relationship between the specific position and the user's position. More specifically, the controller 22 changes the content and mode of display of the information according to the angle relationship between the specific position and the user's position, the distance relationship therebetween, the relationship with the user's direction relative to the specific position, and the like. The controller 22 detects the user's position and a specific position (e.g., the position of the target) using the GPS or the like, and detects the angle relationship between the user's position and the specific position, the distance relationship therebetween, the direction relationship therebetween, and the like based on the detection result.

In addition, when displayed information related to a specific image (e.g., an image related to a target) is specified using the image AR technology, the controller 22 changes the content and mode of display of the information according to the user's position. For example, the controller 22 changes the content and mode of display of the information according to the positional relationship between the target and the user. More specifically, the controller 22 changes the content and mode of display of the information according to the angle relationship between the target and the user, the distance relationship therebetween, the relationship with the user's direction relative to the target, and the like. The controller 22 detects the user's position and the position of the target using GPS or the like, and detects the angle relationship, the distance relationship, the direction relationship, and the like between the user and the target based on the detection result.

Hereinafter, the second exemplary embodiment will be described in detail with reference to specific examples.

Specific Example 12

Figure 20:
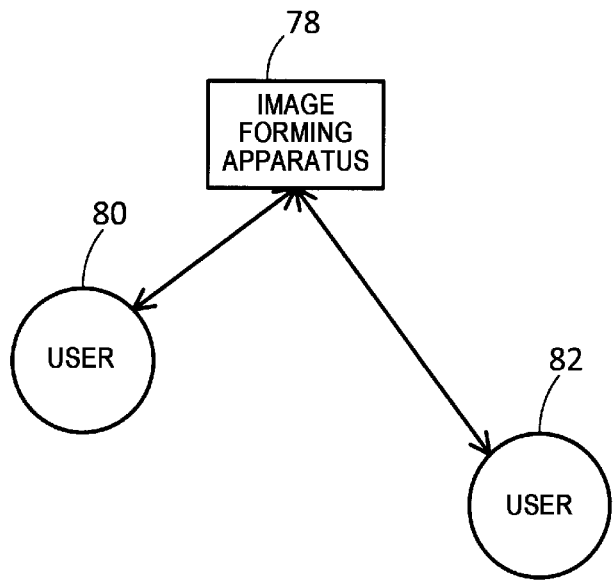
FIG. 20 is a diagram illustrating a positional relationship between the image forming apparatus and users.
Figure 21:
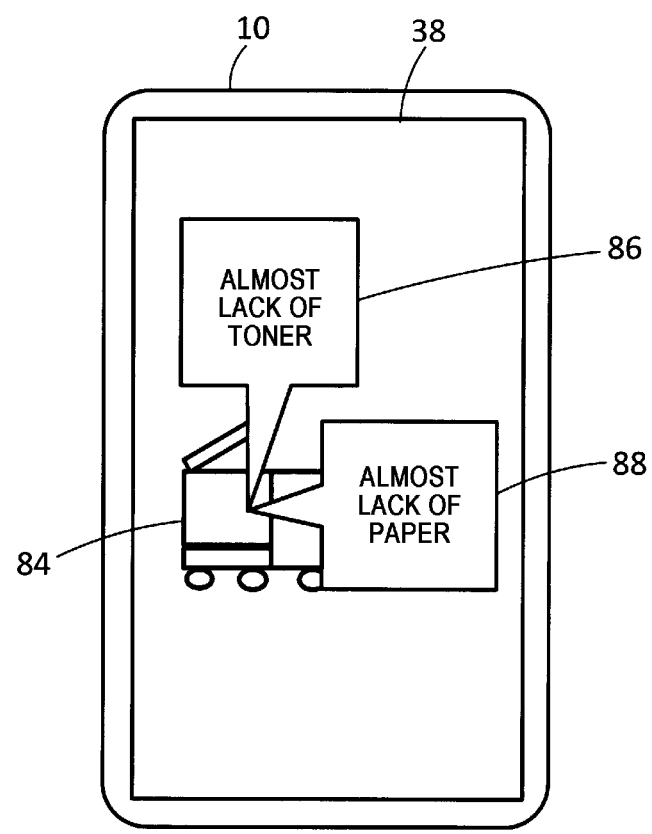
FIG. 21 is a diagram illustrating a screen.
Figure 22:
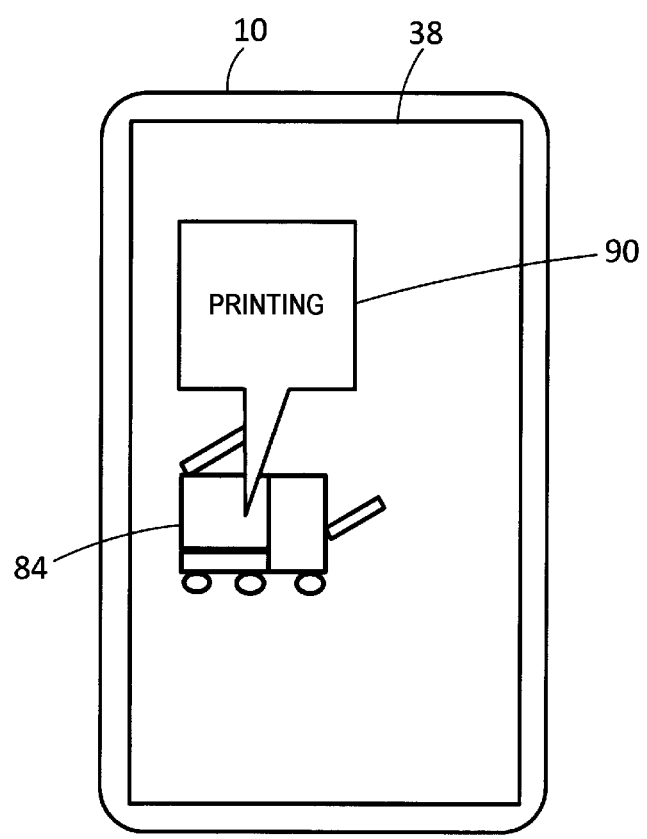
FIG. 22 is a diagram illustrating the screen.

Specific example 12 will be described with reference to FIGS. 20 to 22. FIG. 20 illustrates a positional relationship between the image forming apparatus 78 as a target and the user (terminal device 10). FIGS. 21 and 22 illustrate a screen. As in the first exemplary embodiment, the displayed information associated with the image forming apparatus 78 (or the installation position of the image forming apparatus 78) is specified by the image AR technology or the position AR technology.

A first position 80 is closer to the image forming apparatus 78 than a second position 82. The displayed information for each positional relationship between each position and the position of the image forming apparatus 78 is registered in the displayed information management information. For example, displayed information for each distance between each position and the image forming apparatus 78 is registered in the displayed information management information. The controller 22 changes the content and mode of display of the information according to the distance relationship between the user and the image forming apparatus 78. For example, the controller 22 causes different pieces of information to be displayed on the screen 38 when the user is at the first position 80 and when the user is at the second position 82.

FIG. 21 illustrates the information displayed when the user is at the first position 80 (near the image forming apparatus 78). As illustrated in FIG. 21, the controller 22 causes an image 84 related to the image forming apparatus 78 to be displayed on the screen 38, and further causes information 86 and information 88 associated with the distance between the first position 80 and the position of the image forming apparatus 78 to be displayed on the screen 38. As in the first exemplary embodiment, the controller 22 may cause the displayed information 86 and the displayed information 88 to be partially overlapped with each other on the image 84, or may control the mode of display of the information 86 and the information 88 so that a part or the whole of the each of the information 86 and the information 88 is displayed on the screen 38. In the example illustrated in FIG. 21, each of the information 86 and the information 88 is entirely displayed on the screen 38. The displayed information 86 and the displayed information 88 are information indicating the state of the image forming apparatus 78. Specifically, the displayed information 86 is information indicating that lack of toner will occur soon, and the displayed information 88 is information indicating that lack of paper will occur soon.

FIG. 22 illustrates the information displayed when the user is at the second position 82 (farther from the image forming apparatus 78). As illustrated in FIG. 22, the controller 22 causes the image 84 to be displayed on the screen 38 and further causes information 90 associated with the distance between the second position 82 and the position of the image forming apparatus 78 to be displayed on the screen 38. As in the first exemplary embodiment, the controller 22 may partially overlap the displayed information 90 on the image 84, or when plural pieces of information are displayed, the controller 22 may control the mode of display of each piece of information so that a part or the whole of the pieces of information is displayed on the screen 38. The displayed information 90 is information indicating that the image forming apparatus 78 is printing something.

According to the specific example 12, the displayed information according to the distance between the user and the target is provided to the user. For example, more detailed information may be displayed at the first position 80, and more general information may be displayed at the second position 82. Further, when the target is a device, a menu screen or the like for operating the device is displayed as displayed information at the first position 80, and the information indicating the state of the device may be displayed at the second position 82.

In addition, the controller 22 may change the mode of display of the information at the first position 80 and the second position 82. Specifically, at the first position 80, the controller 22 may enlarge the size of the area of display of the information to allow the information to be displayed on the screen 38. At the second position 82, the controller 22 may reduce the size of the area of display of the information to allow the information to be displayed on the screen 38. Further, at the first position 80, the controller 22 may enlarge the size of display of the character string indicated by the information to allow the information to be displayed on the screen 38. At the second position 82, the controller 22 may reduce the size of display of the character string indicated by the information to allow the information to be displayed on the screen 38.

As another example, the controller 22 may cause each piece of information associated with each distance between the user and the image forming apparatus 78 to be displayed on the screen 38 regardless of the position where the user is present, and change the size of the area of display of each information or change the size of display of the character string indicated by each information according to the distance between the user and the image forming apparatus 78. For example, the controller 22 may cause the information 86 and the information 88 associated with the distance between the first position 80 and the image forming apparatus 78, and the information 90 associated with the distance between the second position 82 and the image forming apparatus 78 to be displayed on the screen 38. When the user is at the first position 80, the controller 22 enlarges the displayed information 86 and the displayed information 88 than the displayed information 90 to allow the information 86 and the information 88 to be displayed on the screen 38. In the meantime, when the user is at the second position 82, the controller 22 enlarges the displayed information 90 than the displayed information 86 and the displayed information 88 to allow the information 90 to be displayed on the screen 38.

Specific Example 13

Figure 23:
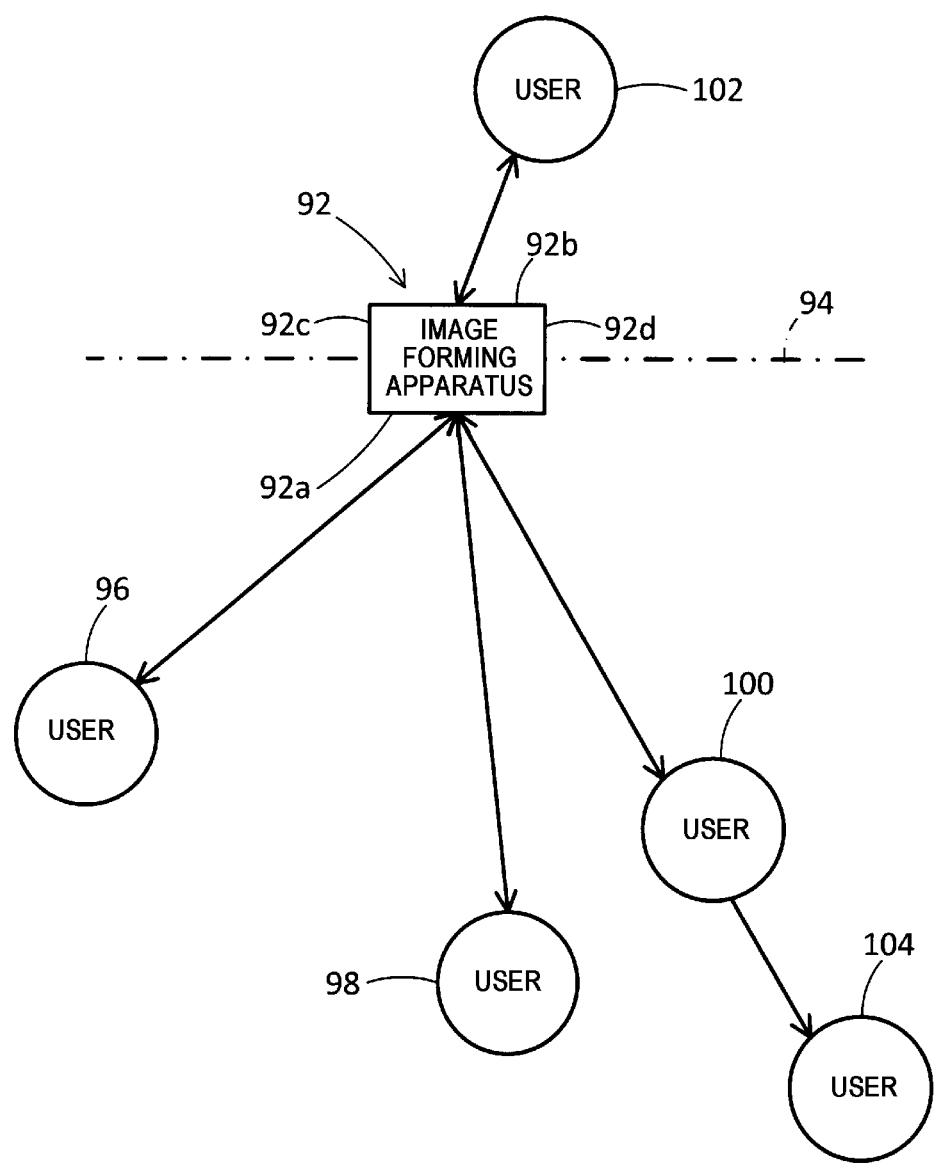
FIG. 23 is a diagram illustrating a positional relationship between the image forming apparatus and users.

A specific example 13 will be described with reference to FIG. 23. FIG. 23 illustrates the positional relationship between the image forming apparatus 92 as a target and the user (terminal device 10). As in the first exemplary embodiment, the displayed information associated with the image forming apparatus 92 (or the installation position of the image forming apparatus 92) is specified by the image AR technology or the position AR technology.

The image forming apparatus 92 is provided with, for example, a front surface 92a, a rear surface 92b, a right side surface 92c, and a left side surface 92d. A virtual line 94 is a line passing through the right side surface 92c and the left side surface 92d.

As in the specific example 12, the displayed information for each positional relationship between each position and the position of the image forming apparatus 92 is registered in the displayed information management information. For example, displayed information for each distance between each position and the image forming apparatus 92 is registered in the displayed information management information. Further, the displayed information for each angle between each position and the image forming apparatus 92 is registered in the displayed information management information. The angle of a certain position is, for example, an angle formed between the virtual line 94 and the corresponding position. In addition, the displayed information for each direction with respect to the image forming apparatus 92 is registered in the displayed information management information. The direction is, for example, above or below the image forming apparatus 92. The front surface, the rear surface, and the side surface of the image forming apparatus 92 may be defined as directions. Further, the displayed information for each height with respect to the image forming apparatus 92 may be registered in the displayed information management information. A combination of at least two of a distance, an angle, a direction, and a height may be associated with displayed information and the displayed information may be associated with each other to be registered in the displayed information management information.

For example, the distance between the first position 96 and the image forming apparatus 92 is the same as the distance between the third position 100 and the image forming apparatus 92, but the angle between the first position 96 and the image forming apparatus 92 is different from the angle between the third position 100 and the image forming apparatus 92. In this case, the controller 22 causes different pieces of information to be displayed on the screen 38 when the user is at the first position 96 and when the user is at the third position 100. In this way, even when the distance to the image forming apparatus 92 is at the same position, different pieces of displayed information for each angle may be provided to the user.

The angle between the third position 100 and the image forming apparatus 92 is the same as the angle between a fifth position 104 and the image forming apparatus, but the angle between the third position 100 and the image forming apparatus 92 is different from the distance between the fifth position 104 and the image forming apparatus 92. In this case, the controller 22 causes different pieces of information to be displayed on the screen 38 when the user is at the third position 100 and when the user is at the fifth position 104. For example, the controller 22 causes detailed information to be displayed on the screen 38 at the third position 100 closer to the image forming apparatus 92, and causes general information to be displayed on the screen 38 at the fifth position 104 farther from the image forming apparatus 92. In this way, even when the angle between each position and the image forming apparatus 92 is at the same position, different pieces of displayed information from each distance may be provided to the user.

Further, the second position 98 is a position above the image forming apparatus 92. For example, when the user looks down the image forming apparatus 92 at the second position 98 and captures the image forming apparatus 92 by the camera 18, the controller 22 causes the information associated with the positional relationship between the second position 98 and the image forming apparatus 92 (the distance, height, and angle) to be displayed on the screen 38. For example, general information on the image forming apparatus 92 is displayed. In this way, even when the distance between each position and the image forming apparatus 92 is at the same position, different pieces of displayed information for each height may be provided to the user.

Also, the fourth position 102 is a position on the rear side of the image forming apparatus 92. When the user captures the rear side of the image forming apparatus 92 from the fourth position 102 by the camera 18, the controller 22 causes the information, which is different from a case where the user is in the front side of the image forming apparatus 92 (e.g., the first position, the second position, the third position, and the fifth position), to be displayed on the screen 38. For example, the information related to the structure, parts, function, and the like of the rear side of the image forming apparatus 92 is displayed on the screen 38.

In addition, the controller 22 may change the contents of the displayed information for each distance, each angle, each direction, or each height, or may change the size of display of the information without changing the content of the displayed information.

Hereinafter, an application example of the specific example 13 will be described. The specific example 13 may be applied to a manufacturing site. In this case, the controller 22 changes the information to be displayed on the screen 38 when the device is captured from the front side of the device and when the device is captured from the rear side of the device. When the device is captured from the front side of the device, information about the structure, parts, and functions of the front side of the device is displayed. When the device is captured from the rear side of the device, information about the structure, parts, and functions of the rear side of the device is displayed. In this way, a person working on the front side (e.g., an operator who assembles parts on the front side) is provided with displayed information about the front side, and a person working on the rear side (e.g., an operator who assembles parts on the rear side) is provided with displayed information about the rear side.

As another example, the specific example 13 may be applied to an event site. For example, the controller 22 causes simple information such as the name of each participating company to be displayed on the screen 38 when a wide range of an event site in which companies are participating is captured from above (when the event site is overlooked). By doing so, a user may easily understand what type of companies participate in the event. In addition, when a company's exhibition booth is captured closely, the controller 22 causes detailed information about the company (e.g., detailed information about the exhibition contents, etc.) to be displayed on the screen 38. This provides the user with detailed company information when the user moves to the booth.

Further, the controller 22 causes the information of the points usable at the event site to be displayed on the screen 38 when the wide range of the event site is captured from above, and when a booth in the event site is captured closely, detailed information about the booth may be displayed on the screen 38.

Other Exemplary Embodiments

Figure 24:
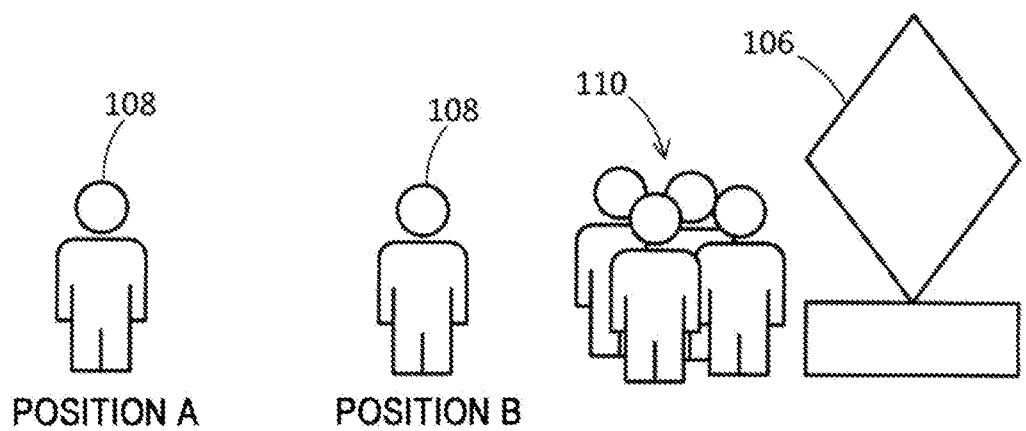
FIG. 24 is a diagram illustrating a positional relationship between users and an object.

Hereinafter, other exemplary embodiments will be described. Here, a description will be made of a case where the first exemplary embodiment and the second exemplary embodiment described above are applied to route guidance. FIG. 24 illustrates a relationship between a user and a destination. The destination corresponds to an example of a specific position, and is a position where the object 106 (object a) is installed. It is assumed that a user 108 captures the object 106 by the camera 18. It is also assumed that since a user group 110 is located around the object 106, a crowd occurs around the object 106.

As in the first exemplary embodiment, the object 106 is identified using the AR technology and the information related to the object 106 is displayed on the UI unit 16 of the terminal device 10.

Figure 25:
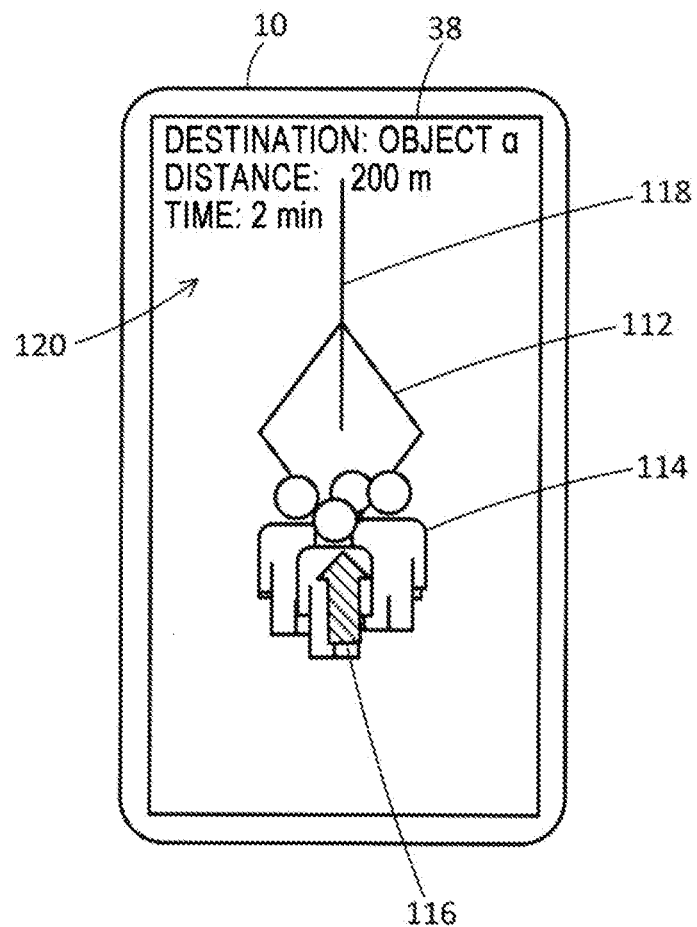
FIG. 25 is a diagram illustrating a screen.
Figure 26:
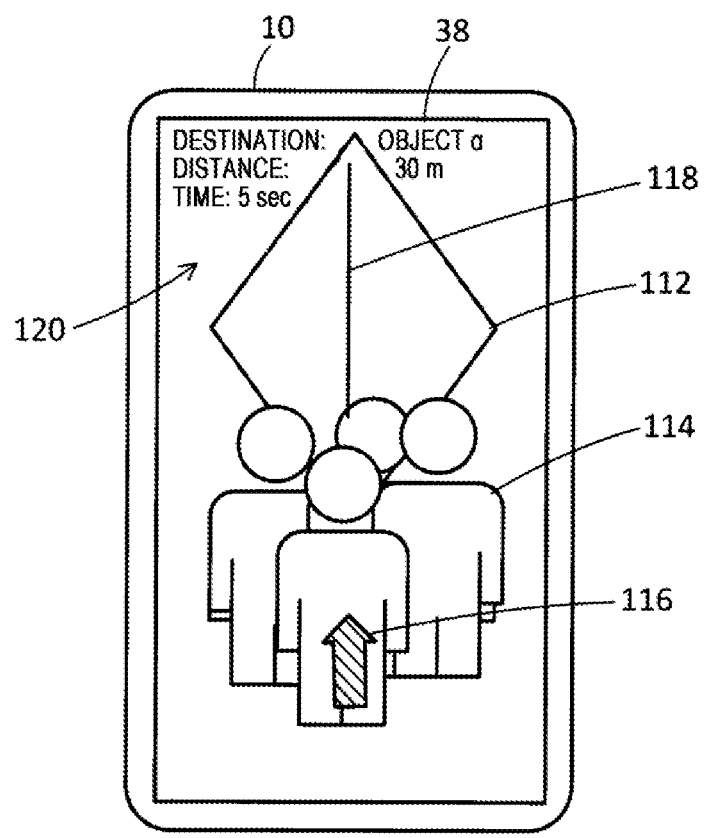
FIG. 26 is a diagram illustrating the screen.

FIGS. 25 and 26 illustrate the screen 38 of the terminal device 10. FIG. 25 illustrates information displayed on the screen 38 when the user 108 is at a position A. FIG. 26 illustrates the information displayed on the screen 38 when the user is at a position B. The position B is closer to the object 106 than the position A.

As illustrated in FIG. 25, an image 112 related to the object 106 (corresponding to an example of a specific image) and an image 114 related to the user group 110 are displayed on the screen 38. The image 112 may be an image generated by capturing the object 106 or an image that schematically represents the object 106 (e.g., an icon).

The controller 22 of the terminal device 10 uses various sensors to calculate at least one of a distance between the user 108 and the object 106, the direction of the object 106 based on the position of the user 108, or the time when the user 108 is estimated to arrive at the object 106 (estimated arrival time). The distance and the direction are calculated using a GPS or the like. The estimated arrival time is calculated based on the distance between the user 108 and the object 106 and the movement speed of the user 108. The moving speed may be, for example, an average moving speed of the user 108 in the past, an average moving speed in a predetermined time back from the current point in time (e.g., an average moving speed of 10 minutes), a predetermined moving speed (e.g., a moving speed designated by the user, and a default moving speed), an average moving speed of a person having the same attribute (e.g., sex, age, height, weight, or the like) as the user 108, or the like.

The controller 22 causes the information obtained as described above as the guide information to be displayed on the screen 38. The guide information is information for guiding the user to the object 106, and may be referred to as information related to the object 106. As illustrated in FIG. 25, the controller 22 causes, for example, an arrow 116, a cover 118, and supplementary information 120 to be displayed as the guide information on the screen 38. The controller 22 may cause at least one of the arrow 116, the cover 118, or the supplementary information 120 to be displayed on the screen 38 as the guide information. Further, the user may be configured to designate the destination, and the controller 22 may be configured to create the guide information about the destination designated by the user and display the information on the screen 38. For example, when the user designates the object 106 as the destination on the screen 38 or when the user designates the object 106 as the destination by voice, the controller 22 creates the guide information for guiding the user to the object 106 and displays the information on the screen 38.

The arrow 116 is an image indicating the direction of the object 106 based on the position A of the user 108. The controller 22 superimposes the arrow 116 on the image 114 as a background image (an image representing a person or an article other than the object 106) and causes the superimposed arrow to be displayed on the screen 38. That is, the controller 22 causes the arrow 116 to be displayed on the front side of the image 114. In this case, even when a person or an article other than the object 106 is displayed on the screen 38, the direction of the object 106 is displayed to the user.

The cover 118 is an image which becomes the cover of the object 106. The controller 22 superimposes the cover 118 on the image 112 related to the object 106 and causes the superimposed cover to be displayed on the screen 38. Further, when the background image is displayed at the display position of the cover 118, the controller 22 superimposes the cover 118 on the background image and causes the superimposed cover to be displayed on the screen 38.

The supplementary information 120 is information including, for example, the name of the object 106 (e.g., object a), the distance to the object 106 (e.g., 200 m), the estimated arrival time (e.g., 2 minutes), and the like. The controller 22 may cause at least one piece of information among the name, the distance, or the estimated arrival time to be displayed as the supplementary information 120 on the screen 38.

The controller 22 changes at least one of the arrow 116, the cover 118, and the supplementary information 120 according to the positional relationship between the user 108 and the object 106.

For example, when the user moves from the position A to the position B, the display content of the screen 38 is changed from the display content illustrated in FIG. 25 to the display content illustrated in FIG. 26 according to the movement.

As in FIG. 25, FIG. 26 illustrates that the images 112 and 114, the arrow 116, the cover 118, and the supplementary information 120 are displayed on the screen 38. Since the user is at the position B closer to the object 106 than the position A, the images 112 and 114 at the position B are displayed larger than images 112 and 114 at the position A. Also, in this case, the controller 22 superimposes the arrow 116 on the image 114 and superimposes the cover 118 on the images 112 and 114. In addition, since the distance to the object 106 and the estimated arrival time have changed, the controller 22 updates the supplementary information 120.

The controller 22 changes the mode of display of the guide information according to the relationship between each of the images displayed on the screen 38 (e.g., the images 112 and 114) and the guide information displayed on the screen 38 (e.g., the arrow 116, the cover 118, and the supplementary information 120). For example, the controller 22 changes at least one of the display position, the display color, or the display size of the guide information as a change in the display mode.

For example, when the display position of the supplementary information 120 is overlapped with the display position of other images (e.g., the images 112 and 114) or when the contrast of the color of the supplementary information 120 is weak (e.g., when the contrast value is less than or equal to a threshold value) in relation to other images (e.g., the images 112 and 114), the controller 22 changes the display color of the character string so that the character string indicated by the supplementary information 120 is displayed prominently. For example, when the display position of the supplementary information 120 is not overlapped with the display position of the images 112 and 114 (see FIG. 25), the controller 22 uses a predetermined color (e.g., a light blue color or the like) as the display color of the character string. When the display position of the supplementary information 120 is overlapped with the display position of the image 112 (see FIG. 26), the controller 22 uses a color (e.g., a black color or the like) in which the contrast is stronger in relation to the color of the image 112 in which the supplementary information 120 is overlapped as the display color of the character string. This solves the situation in which the character string is embedded in other images and is difficult for the user to see. In addition, the controller 22 may change the thickness of the character, the size of the character, or the type of the font.

Figure 27:
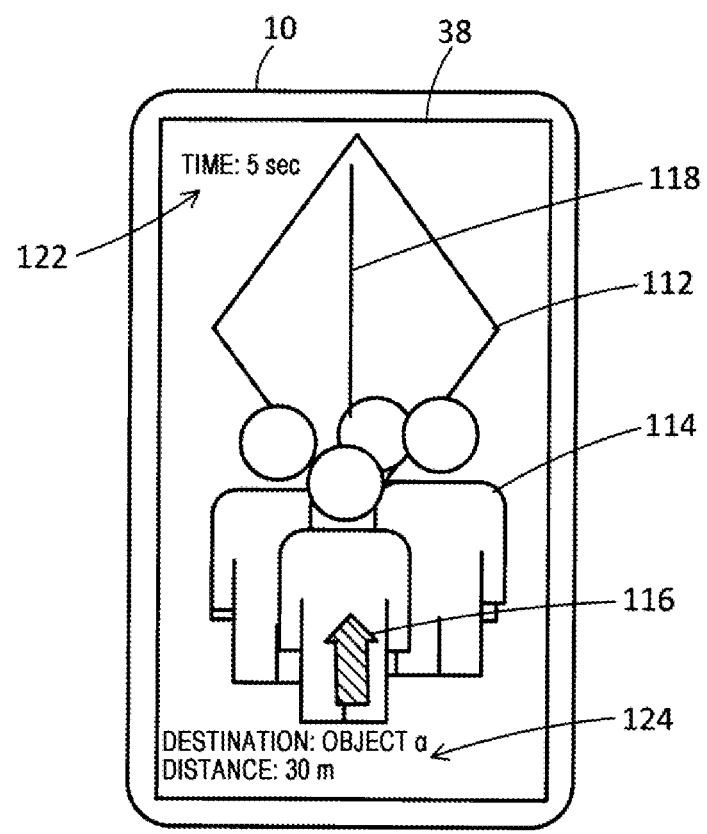
FIG. 27 is a diagram illustrating the screen.

FIG. 27 illustrates another display example when the user 108 is at the position B. In the example illustrated in FIG. 27, the controller 22 changes the display position of each information so that each information included in the supplementary information 120 does not overlap with other images (e.g., images 112 and 114). For example, the controller 22 divides the information 122 indicating the estimated arrival time (character string) and the information 124 indicating the destination and the distance (character string) to allow the information 122 and the information 124 to be displayed at the position not overlapping with the images 112 and 114. Further, the controller 22 may change the display color and display size (e.g., the thickness or size of the character) of each information while changing the display position of the information.

Also, the controller 22 may output the supplementary information 120 as voice information according to the user's instruction or automatically. For example, when the size of the predetermined character is maintained and the supplementary information 120 may not be displayed without overlapping with other images (e.g., images 112 and 114), the controller 22 displays the supplementary information 120 or automatically outputs the supplementary information 120 as voice information without displaying the supplementary information 120. In addition, the controller 22 may output information indicating the direction of the object 106 as voice information.

Figure 28:
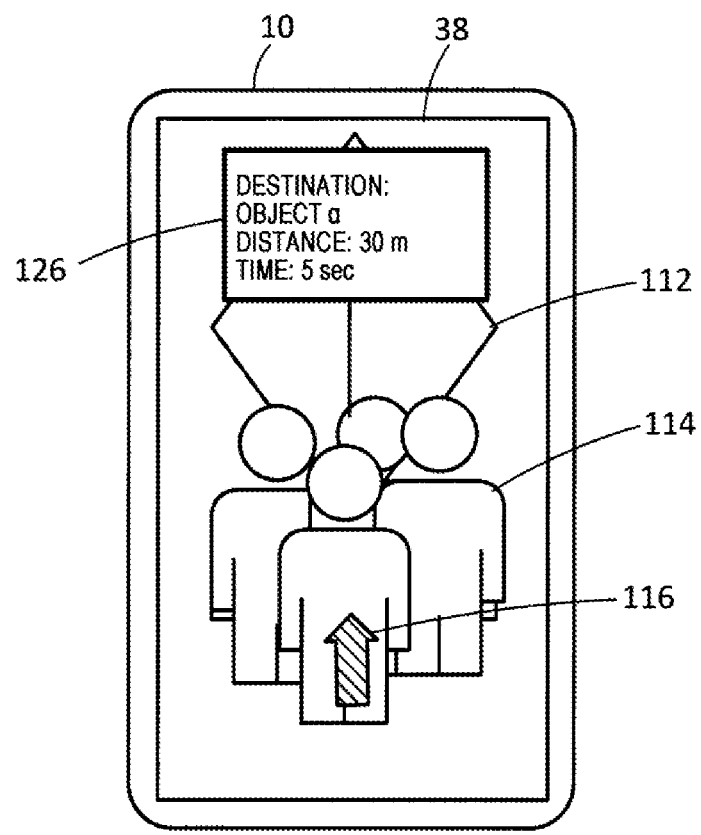
FIG. 28 is a diagram illustrating the screen.

FIG. 28 illustrates another display example when the user 108 is at the position B. In the example illustrated in FIG. 28, the controller 22 causes the supplementary information 126 to be displayed on the screen 38 in place of the supplementary information 120 illustrated in FIG. 26. The contents indicated by the supplementary information 126 are the same as those indicated by the supplementary information 120. The supplementary information 126 is surrounded by a frame, whereby the supplementary information 126 is highlighted. In addition, the area where the supplementary information 126 is displayed (the area surrounded by the frame) is painted tightly. Thus, the background portion in which the supplementary information 126 is superimposed is not displayed, and the supplementary information 126 is not buried in the background portion.

Each of the terminal device 10 and the server 12 described above is implemented by cooperation between hardware and software as an example. Specifically, each of the terminal device 10 and the server 12 has one or more processors such as a CPU (not illustrated). The functions of the respective parts of the terminal device 10 and the server 12 are implemented by reading and executing the program stored in a storage device (not illustrated) by the one or more processors. The above-described program is stored in a storage device via a recording medium such as a CD or a DVD or via a communication path such as a network. As another example, the respective parts of the terminal device 10 and the server 12 may be implemented by a hardware resource such as, for example, a processor, an electronic circuit, or an application specific integrated circuit (ASIC). A device such as a memory may be used for such an implementation. As another example, the respective parts of the terminal device 10 and the server 12 may be implemented by a digital signal processor (DSP) or a field programmable gate array (FPGA).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a controller configured to control a mode of display of each piece of information in such a manner that a part or whole of each piece of information included in a plurality of pieces of information related to a specific position is displayed on a display unit,
wherein a captured image is displayed on the display unit,
when a new image is added to the captured image, the controller causes the plurality of pieces of information to be displayed in front of the new image,
wherein the controller further changes information displayed on the display unit according to a positional relationship between a user's position and the specific position,
wherein the controller causes guide information for guiding the user to the specific position to be displayed on the display unit and changes the guide information according to the positional relationship between the user and the specific position, and
wherein among information indicating a distance between the user's position and the specific position, information indicating a direction of the specific position based on the user's position, and information indicating a time when the user is estimated to arrive at the specific position, the controller causes at least one piece of information to be displayed as the guide information on the display unit and changes the at least one piece of information according to the positional relationship between the user's position and the specific position.

2. The information processing apparatus according to claim 1, wherein
when the captured image is displayed on the display unit and the plurality of pieces of information are displayed on the captured image in a superimposed manner, the controller controls the display mode in such a manner that a part or whole of the each piece of information is displayed on the display unit.

3. The information processing apparatus according to claim 1, wherein
the controller controls the display mode in such a manner that information related to a specific target among the plurality of pieces of information is displayed on the display unit.

4. The information processing apparatus according to claim 3, wherein
when an image related to the specific target is displayed on the display unit and information related to the specific target is displayed on the image related to the specific target in a superimposed manner, the controller controls the display mode in such a manner that a part or whole of each piece of information related to the specific target is displayed on the display unit.

5. The information processing apparatus according to claim 1, wherein
the controller controls the display mode in such a manner that, among the plurality of pieces of information, a part or whole of each piece of information related to a place on which a capturing unit fixes a focus is displayed on the display unit.

6. The information processing apparatus according to claim 1, wherein
the plurality of pieces of information include information related to a first target and information related to a second target, and
the controller causes a first image related to the first target and a second image related to the second target to be displayed on the display unit and changes a mode of display of the plurality of pieces of information according to a relationship between displayed sizes of the first image and the second image.

7. The information processing apparatus according to claim 1, wherein
the plurality of pieces of information include information related to a first target and information related to a second target, and
the controller causes a first image related to the first target and a second image related to the second target to be displayed on the display unit and changes a mode of display of the plurality of pieces of information according to a positional relationship between a user and the first target and a positional relationship between the user and the second target.

8. The information processing apparatus according claim 1, wherein
the controller changes the display mode according to a priority of the each piece of information.

9. The information processing apparatus according to claim 8, wherein
the controller causes information having a high priority to be displayed in front of information having a low priority.

10. The information processing apparatus according to claim 1, wherein
the controller causes details of a piece of information selected by a user from the plurality of pieces of information to be displayed.

11. The information processing apparatus according to claim 1, wherein
the plurality of pieces of information include related pieces of information acquired by one or more applications, and
the controller integrates the related pieces of information for each application and causes the related pieces of information to be displayed on the display unit.

12. The information processing apparatus according to claim 1, wherein
in a case where a distance between the user's position and the specific position is less than a threshold value, the controller compares the case with a case where the distance between the user's position and the specific position is equal to or greater than the threshold value and causes more detailed information to be displayed on the display unit.

13. The information processing apparatus according to claim 1, wherein
the controller causes a captured image to be displayed on the display unit and further changes a mode of display of the at least one piece of information according to a relationship between the captured image and the at least one piece of information.

14. The information processing apparatus according to claim 13, wherein
when changing the display mode, the controller changes at least one of a display position, a display color, and a display size of the at least one piece of information.

15. An information processing apparatus comprising:
a controller configured to control a mode of display of each piece of information in such a manner that a part or whole of each piece of information included in a plurality of pieces of information related to a specific image is displayed on a display unit,
wherein the specific image is a captured image obtained by capturing,
when a new image is added to the captured image, the controller causes the plurality of pieces of information to be displayed in front of the new image,
wherein the controller further changes information displayed on the display unit according to a positional relationship between a user's position and the specific image,
wherein the controller causes guide information for guiding the user to the specific image to be displayed on the display unit and changes the guide information according to the positional relationship between the user and the specific image, and
wherein among information indicating a distance between the user's position and the specific image, information indicating a direction of the specific image based on the user's position, and information indicating a time when the user is estimated to arrive at the specific image, the controller causes at least one piece of information to be displayed as the guide information on the display unit, and changes the at least one piece of information according to the positional relationship between the user's position and the specific image.

16. The information processing apparatus according to claim 15, wherein
the specific image is an image related to a target.

17. The information processing apparatus according to claim 16, wherein
when the specific image is displayed on the display unit and the each piece of information is displayed on the specific image in a superimposed manner, the controller controls the display mode in such a manner that a part or whole of the each piece of information is displayed on the display unit.

18. The information processing apparatus according to claim 16, wherein
the target is an identified object.

19. A non-transitory computer readable medium storing a program causing a computer to execute information processing, the information processing comprising:
controlling a mode of display of each piece of information in such a manner that a part or whole of each piece of information included in a plurality of pieces of information related to a specific position is displayed on a display unit,
and controlling a captured image to be displayed on the display unit,
when a new image is added to the captured image, controlling the plurality of pieces of information to be displayed in front of the new image, changing information displayed on the display unit according to a positional relationship between a user's position and the specific position, controlling guide information for guiding the user to the specific position to be displayed on the display unit and changing the guide information according to the positional relationship between the user and the specific position, and among information indicating a distance between the user's position and the specific position, information indicating a direction of the specific position based on the user's position, and information indicating a time when the user is estimated to arrive at the specific position, controlling at least one piece of information to be displayed as the guide information on the display unit, and changing the at least one piece of information according to the positional relationship between the user's position and the specific position.

* * * * *